(12) United States Patent
Howell et al.

(10) Patent No.: US 7,430,553 B2
(45) Date of Patent: Sep. 30, 2008

(54) MANAGING STATES WITH DELTA PAGER

(75) Inventors: Jonathan R. Howell, Seattle, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 11/275,434

(22) Filed: Dec. 30, 2005

(65) Prior Publication Data

US 2007/0168393 A1 Jul. 19, 2007

(51) Int. Cl.
*G06F 17/30* (2006.01)

(52) U.S. Cl. .................... 707/8; 707/200; 711/141

(58) Field of Classification Search ............ 707/2, 707/8, 200
See application file for complete search history.

(56) References Cited

U.S. PATENT DOCUMENTS

| | | | |
|---|---|---|---|
| 5,241,675 A * | 8/1993 | Sheth et al. ............. | 707/8 |
| 5,317,731 A * | 5/1994 | Dias et al. .............. | 707/8 |
| 5,499,367 A * | 3/1996 | Bamford et al. ......... | 707/8 |
| 5,561,778 A * | 10/1996 | Fecteau et al. .......... | 711/144 |
| 5,701,480 A * | 12/1997 | Raz ....................... | 718/101 |
| 5,903,898 A * | 5/1999 | Cohen et al. ........... | 707/200 |
| 5,983,225 A | 11/1999 | Anfindsen | |
| 6,199,141 B1 | 3/2001 | Weinreb et al. | |
| 6,594,751 B1 | 7/2003 | Leivent | |
| 6,678,704 B1 * | 1/2004 | Bridge et al. ........... | 707/8 |
| 7,103,588 B2 * | 9/2006 | Beck et al. ............. | 707/2 |

FOREIGN PATENT DOCUMENTS

WO WO9609730 A1 3/1996

\* cited by examiner

*Primary Examiner*—Debbie M. Le
*Assistant Examiner*—Jieying Tang
(74) *Attorney, Agent, or Firm*—Lee & Hayes, PLLC

(57) ABSTRACT

A delta pager maintains a database with atomic, isolated transactions. When a transaction seeks to make changes to the database, the delta pager stores the changes in write buffers, and applies the changes when intervening transactions do not literally or substantively change the state of the database relied upon by the transaction. The delta pager applies the changes to commit the transaction by conjoining the write buffers with the current state of the database to form a new data structure representing the state of the database. The delta pager coalesces write buffers to maintain efficiency, subject to snapshots the delta pager respects to preserve selected states of the database. The delta pager makes selected sections of the database durable by moving selected data to a durable store. The delta pager also provides cache objects between the durable store and current transactions to promote efficient access to data.

11 Claims, 25 Drawing Sheets

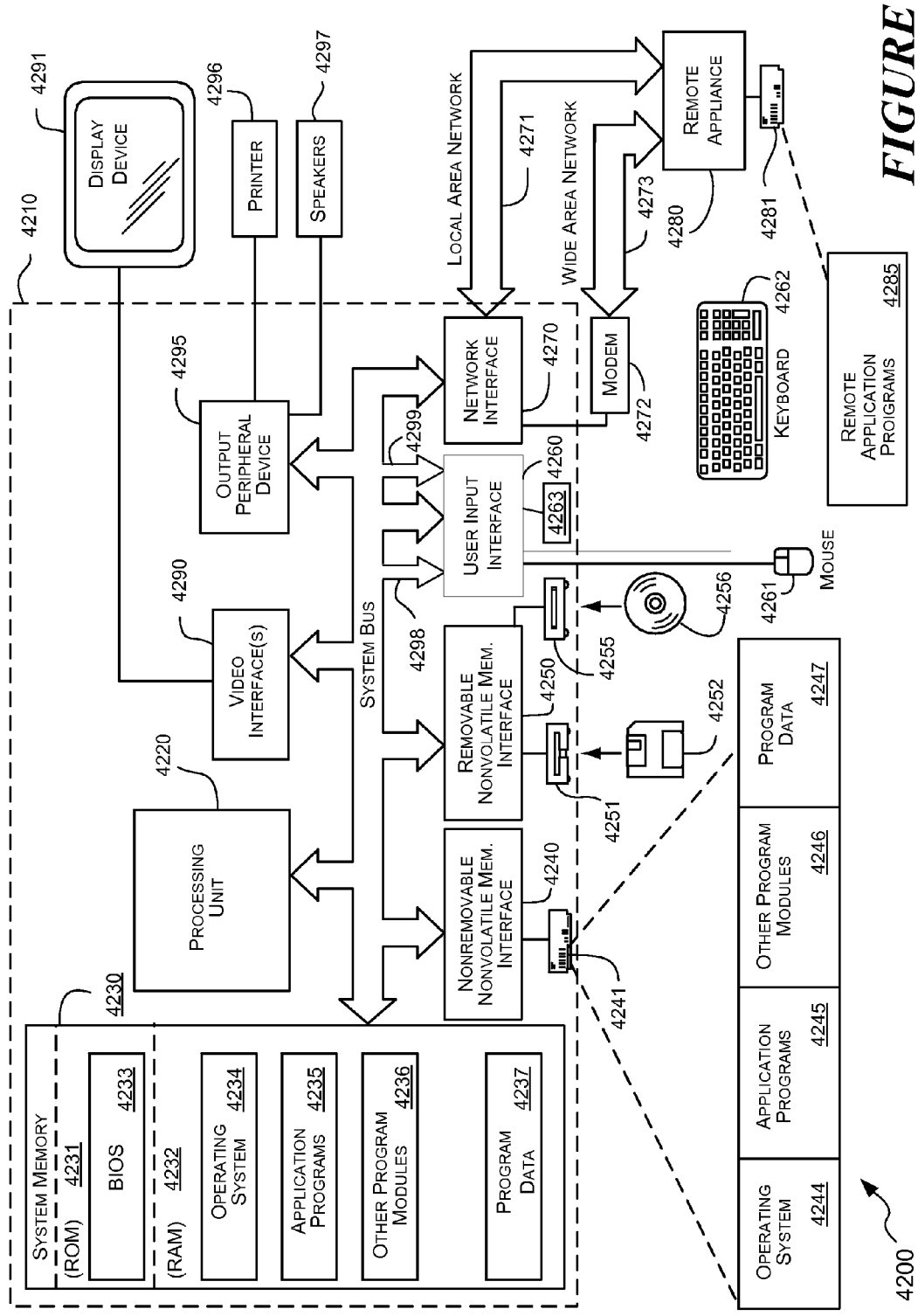

MANAGING STATES WITH DELTA PAGER

BACKGROUND

A pivotal concern in performing database transactions is database integrity. To preserve database integrity, it is important to ensure that transactions observe requirements such as atomicity and isolation. The atomicity requirement mandates that either all or none of the tasks of a transaction be performed, so that incomplete transactions are not applied to the database. The isolation requirement dictates that transactions be handled separately from other transactions, so that no transaction accesses or interferes with an intermediate state of another transaction. Observing the atomicity and isolation requirements prevents transactions from corrupting each other and the database as a whole.

In networked systems, many users and many applications may concurrently seek to perform transactions on the same data. Even in a standalone system, multiple applications may concurrently seek to perform transactions on the same data, possibly with multiple processing threads of each application contending with each other. Because it is difficult to foresee, let alone avoid, all the situations in which in transactions may apply conflicting or inconsistent changes to a database, maintaining database integrity is a significant challenge.

One way to preserve database integrity is to place a lock on a portion of a database used by a current transaction. Placing a lock on the portion of the database prevents other transactions from reading or overwriting the data until the current transaction is complete. Preventing other transactions from reading from the portion of the database ensures that the other transactions will not reach results based on values that the current transaction may change. Correspondingly, preventing other transactions from overwriting that portion of the database ensures that other transactions will not affect the current transaction.

However, although placing a lock on a portion of a database may help to preserve data integrity, it may also result in a countervailing cost. Placing a lock on a portion of a database that a number of transactions seek to access may create a significant backlog of transactions. Some or all of the waiting transactions may not make any changes to a current state of the database, or may not read from, write to, or change particular values that the current transaction uses. Nonetheless, placing the lock on the portion of the database will preserve the integrity of the database, even if it slows access to the database.

One form of lock is a lease. A lease, just as in the case of leases of apartments, buildings, cars, and equipment, is an exclusive grant for a limited period of time. Thus, when a transaction is granted a lease on selected data, the transaction is provided with exclusive access to the selected data for a limited period of time. By limiting the exclusive access to the data to a period of time, if the transaction fails to release the data when the transaction is complete, or the system on which the transaction runs should crash, the data will be unlocked so that other transactions will not have to wait indefinitely to access the data. Conventionally each transaction waiting for the selected data will have to wait until all of the transactions previously queued for the data complete their use of the data, or the leases allocated to each transaction expire.

There can be potentially significant delays as a number of transactions wait for access to leased data. In addition, a system controlling the leasing of data may present a bottleneck in efforts to access data. The system controlling the leases, as a single point of control for data access, may cause transactions delays in attempting to respond to lease requests. Furthermore, because the system may be receiving multiple requests for the same selected data, handling these numerous and potentially repeated requests will waste computing cycles, resulting in further delays to transactions seeking the same data or any other data.

SUMMARY

A delta pager maintains a database with atomic, isolated transactions. When a transaction seeks to make changes to the database, the delta pager stores the changes in write buffers, and applies the changes when intervening transactions do not literally or substantively change the state of the database relied upon by the transaction. The delta pager applies the changes to commit the transaction by conjoining the write buffers with the current state of the database to form a new data structure representing the state of the database. The delta pager coalesces write buffers to maintain efficiency, subject to snapshots the delta pager respects to preserve selected states of the database. The delta pager makes selected sections of the database durable by moving selected data to a durable store. The delta pager also provides cache objects between the durable store and current transactions to promote efficient access to data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number or the two left-most digits of a four-digit reference number identify the figure in which the reference number first appears. The use of the same reference numbers in different figures indicates similar or identical items.

FIG. 42 illustrates an exemplary operating environment suitable for the performing the database transactions and operations previously described.

DETAILED DESCRIPTION

Overview

Figure 1:
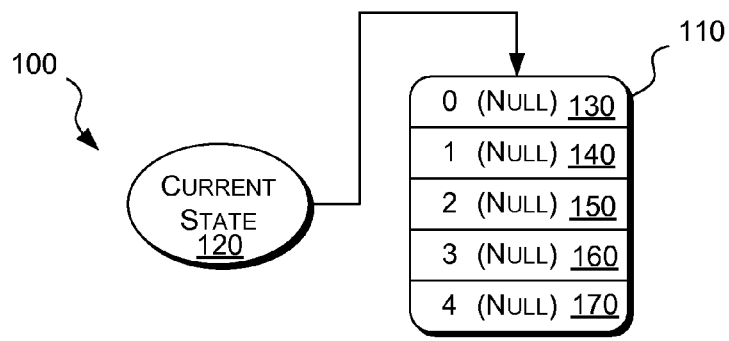
FIG. 1 illustrates an initial, current state of a database.

The term "delta pager" describes embodiments of methods and systems for processing changes to a database while maintaining the integrity of the database and preserving selected states of the database. By respecting the immutability of pointers between recognized objects, the delta pager preserves the integrity of states of the database while also maintaining efficiency.

In one mode, the delta pager manages transactions by using a current state pointer to track a current state of the database including a complete mapping of all the data stored in the database. In the complete mapping, for each address or representation of an address defined for the database, there will be a data value or a null value. A partial mapping may include one or more objects that the delta pager uses to store changes that a transaction seeks to apply to the current state of the database existing at the time the transaction was initiated. If the transaction is committed to the database, the partial mapping is appended to the original current state of the database to form a new current state. When the new current state is accessed through the newly-applied partial mapping, the assignments of values to addresses in the partial mapping supersede those in the original state, and thereby effectively overwrite or change data values in the original state of the database.

To clarify and distinguish terminology used in this description, a mapping of the database refers to an assignment of address values to data values. A complete mapping of the database refers to a complete set of assignments of all the addresses in the database to data values (or null values) stored at those addresses. A partial mapping refers to a set of changes or overwrites that a transaction makes or seeks to make to the database, including the addresses to which the transaction seeks to write data, and the data values the transaction seeks to write to the addresses. When a transaction is committed to the database, a partial mapping may be added to the previous complete mapping, resulting in an updated current mapping of the database. Thus, a current, complete mapping of the database may include a series of partial mappings, where later-added partial mappings may overwrite or change the assignments of addresses included in previous partial mappings.

A state of the database refers to a collection of objects, stored in memory, disk, or mass storage, in which a mapping of the database is stored. The objects within the state include buffers that the delta pager creates for transactions to store changes the transaction seeks to write to the database, as well as other objects in which the buffers may be collected. Buffers, other objects, and how these objects are joined, coalesced, and otherwise manipulated, is described in detail below. A current state of the database includes those objects that present the current, complete mapping of the database. As explained below, the delta pager also maintains other states, such as the state of the database existing when a transaction is initiated. The delta pager tracks this state to determine whether the transaction should be committed to the database. The delta pager also maintains selected states to preserve those states, and the mappings of the database those states represent, for later use.

As each transaction initiates, the delta pager allows the transaction to be executed based on a state of the database existing at the time the transaction was initiated. The transaction then creates at least one object, such as a write buffer, and points the write buffer to the state of the database existing at the time the transaction was initiated. The delta pager may use a series of buffers, wherein each buffer stores a single change the transaction seeks to apply to the database, where each buffer points to a preceding buffer to preserve the state of the database. Alternatively, the delta pager may store all changes a transaction seeks to make in a cumulative write buffer that points to the current state of the database at the time the transaction was initiated. The buffers or other objects pointing to the state at the time the transaction was initiated represent a partial mapping of the changes the transaction seeks to apply to the database.

If the delta pager finds no indication that one or more intervening transactions prevent it from applying the current transaction, the delta pager commits the transaction by changing the current state pointer that the delta pointer uses to track the current state of the database to point to the last buffer, or only buffer, created for the transaction. Changing the current state pointer to point to the buffer creates a new, updated state of the database, potentially changing data values in the complete mapping of the database.

The delta pager may use read buffers and write buffers to process transactions. Read buffers track data the transaction accesses. When a current transaction is complete, the delta pager uses the read buffer to determine whether to commit the transaction. The delta pager may abort the transaction if the read buffer shows the current transaction read data that was overwritten or changed by an intervening transaction.

After the delta pager commits a plurality of changes to the database, the delta pager may coalesce buffers or other objects in the current state of the database for the sake of efficiency. The delta pager may coalesce a plurality of objects in one partial mapping with objects in another partial mapping. Assignments of addresses in the newer of the two partial mappings will be added to or will replace assignments included in the older partial mapping. Coalescing may result in one or more coalesced objects, including memory objects or durable objects, or the delta pager may coalesce the buffers by applying the changes stored in the buffers to an original state of the database. The delta pager provides snapshot pointers to allow for preservation of selected states. Any state associated with a snapshot pointer will not be coalesced with buffers representing changes made to the state preserved by the snapshot pointer.

The delta pager allows the database and changes made to the database to be made durable. The delta pager may copy one or more objects used to maintain the current state of the database to durable, nonvolatile storage. The delta pager also provides for cache objects to provide more rapid access to a portion of the current state of the database stored in mass storage media, including portions of the current state that the delta pager moved to nonvolatile storage to make those portions durable. The delta pager may use the cache objects to store null data ranges in the state of the database to facilitate range queries.

Processing Transactions Using Write Buffers

FIG. 1 illustrates a current state 100 of a database. The current state 100 includes an exemplary original state 110 of the database. The database may reside in volatile memory or in nonvolatile storage. The delta pager uses a current state pointer 120 to point to the current state which includes only the original state 110 in FIG. 1.

The original state 110 is an object that maintains five records, record 0 130, record 1 140, record 2 150, record 3 160, and record 4 170, that each presently store a null value. Note that null values need not actually be stored in the original state. Also, the original state 110 may include any initial state, including null and non-null values, to which transactions may apply changes.

Figure 2:
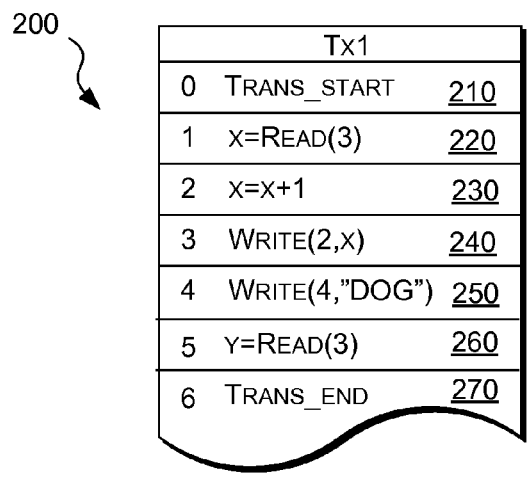
FIG. 2 illustrates a first transaction directed to the database.

FIG. 2 illustrates an exemplary transaction, transaction 1 200 including a plurality of instructions 210-270. Some of the instructions, such as instruction 1 220, "x=Read(3)," seek to read data from the database. Other instructions, such as instruction 3 240, "Write (2,x)," seek to apply a change to the database that would result in assigning or reassigning a value to an address in the database.

Figure 3:
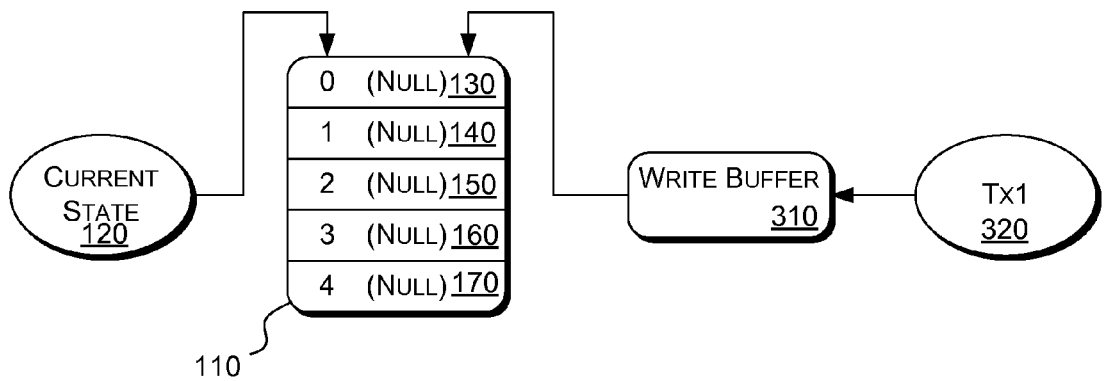
FIGS. 3-6 illustrate the transaction being executed and committed to the database using buffers.

FIG. 3 illustrates one mode of the delta pager initiating a transaction, such as transaction 1 200, against a database. Transaction 1 200 begins with a transaction start instruction, trans_start 210. After the initiation of transaction 1 210, the current state pointer 120 continues to point to the state of the database at time the transaction was initiated, the original state 110. The delta pager creates a first write buffer 310, in which the delta pager will store a change that transaction 1 200 seeks to apply. The delta pager points the write buffer 310 to the state at the time transaction 2 200 was initiated, which was indicated by the current state pointer 120. The delta pager also creates a transaction pointer 320, and points the transaction pointer 320 to the first write buffer 300 which, in turn, points to the current state.

Figure 4:
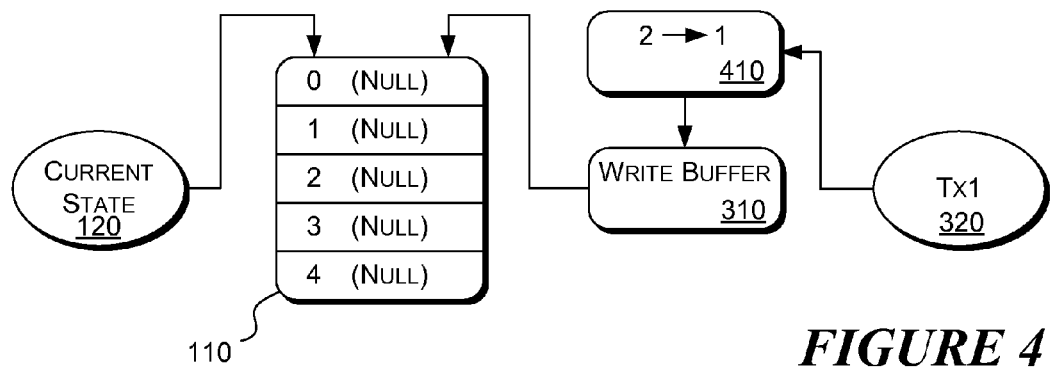
Figure 5:
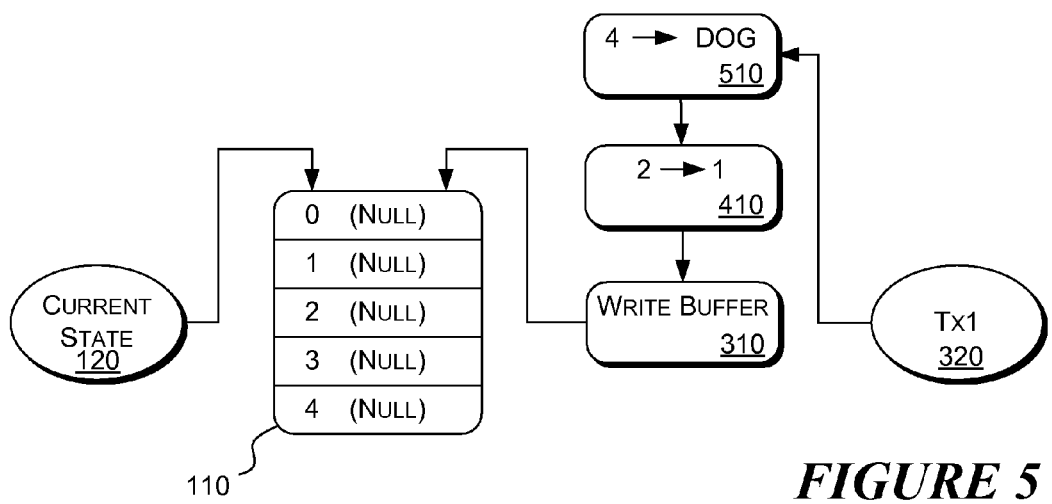
Figure 6:
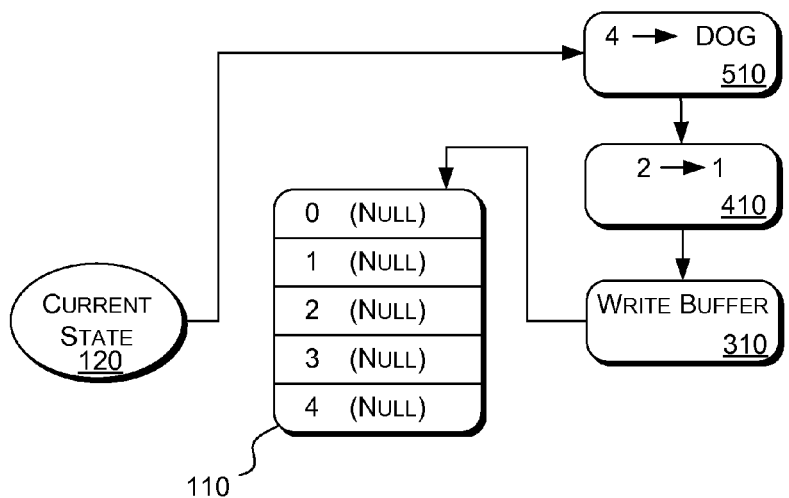

FIGS. 4-6 illustrate how the delta pager process transaction 1 200. Referring to FIG. 2, instruction 1 220, "x=Read(3)," reads the current value of x, which is null, from address 3. Instruction 2 230, "x=x+1," increments the value of x by one which, in this case, changes the value of x to 1. Instruction 3 240, "Write(2,x)," instructs a computing system to write the value of x to address 2.

The delta pager does not write the value 1 to address 2 in the original state 110. Instead, as shown in FIG. 4, the delta pager creates a second write buffer 410. The second write buffer 410 points to the first write buffer 310, and the delta pager switches the transaction pointer 320 to point to the second write buffer 410 to maintain a partial mapping of the database indicating how transaction 2 200 would modify the state of the database at the time the transaction was initiated. The delta pager stores the change of writing the value 1 to address 2 in the second write buffer 410.

FIG. 5 illustrates the delta pager's response to a second change that transaction 1 200 seeks to make to the database. Instruction 4 250, "Write(4,"DOG")," instructs a computing system to store the string "DOG" in address 4. Again, instead of writing the change to the original state 110, the delta pager creates a third write buffer 510 that points to the second write buffer 410. The delta pager also changes the transaction pointer 320 to point to the third write buffer 510 to preserve the state of the database as transaction 1 200 would modify it, and stores the string "DOG" in the third write buffer 510. Thus, reading from the transaction pointer 320, the partial mapping of the database for transaction 21200 includes the modifications that address 2 stores the value 1, and address 4 stores the string "DOG" However, the transaction has changed neither the original state 110, nor the current state indicated by the current state pointer 120.

FIG. 6 illustrates how delta pager commits transaction 1 200 to the database. Because the transaction pointer 320, through the write buffers 510, 410, and 310, or points to the same state to which the current state pointer 120 points, the delta pager determines that no intervening transactions have changed the current state of the database to preclude transaction 1 200 from being committed to the database. Thus, the delta pager commits transaction 1 200 to the database by changing the current state pointer 120 to point to the partial mapping created for transaction 1 200, which includes the original state 110 as modified by the write buffers 310, 410 and 510. Thus, the delta pager changes the current state pointer 120 to point to the third write buffer 510, the last write buffer added by transaction 1 200. The delta pager then deletes the transaction pointer 320. The current state pointer 120 now points to an updated state of the database that includes the original state 110 updated by changes stored in write buffers 310, 410 and 510.

Using the current state of FIG. 6, when a transaction accesses the database, the delta pager uses the state of the database existing at the time the transaction is initiated, which is identified by the current state pointer 120. Using the current state, if a transaction seeks to identify the contents of address 4, in the buffer 510 it will find the string "DOG." On the other hand, if the transaction seeks the contents address 2, it will not find it in the buffer 510. Thus, the transaction will proceed to buffer 410, where the transaction will find the value 1. If the transaction seeks another value, in the example of FIG. 6, the transaction will access all the buffers until finding that the original state 110 includes only null values for the other addresses. Thus, the delta pager changes data by adding buffers or other objects to the current state of the database.

An invariant of the delta pager is that it respects the immutability of each of the pointers that it creates. The immutability invariant maintains that the state upon which each object depends and, thus, to which it points is never changed as long as a pointer points to that object. For example, the first write buffer 310 points to the original state 110 of the database. Regardless of subsequent changes transaction 1 200 applies to the database, the first write buffer 310 always points to a state of the database that includes only the original state 110. Similarly, the second write buffer 410 points to the first write buffer 310. The second write buffer 410 also points to an immutable state of the database including the original state 110 and write buffer 310, which does not modify the original state 110. The third write buffer 510 points to the second write buffer 410, thus, pointing to its own partial mapping of the database, including the original state 110 as modified by the second write buffer 410. The immutability of these pointers has advantages which are described below.

Cumulative Write Buffers and Rewriting Single Write Buffers

Figure 7:
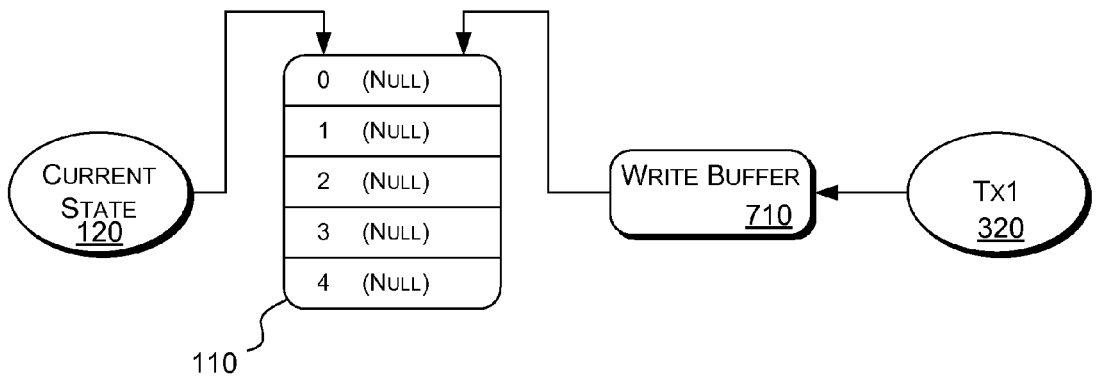
FIGS. 7-11 illustrate the transaction being executed using cumulative write buffers.

In the mode just described, the delta pager creates a new write buffer to initiate a transaction and to store each change that a transaction seeks to apply to the database. Alternatively, the delta pager may employ different types of objects, such as cumulative buffers, or the delta pager may overwrite an existing buffer to store one or more changes FIG. 7 illustrates the delta pager processing a transaction using cumulative write buffers. As in the example of FIG. 3, the delta pager initiates transaction 1 200 by creating a first cumulative buffer 710 that points to the current state existing when the transaction was initiated, as indicated by the current state pointer 120. The delta pager again creates a transaction pointer 320 and points it to the most recently created write buffer to maintain a partial mapping of the database as it would be modified by transaction 1 200.

Figure 8:
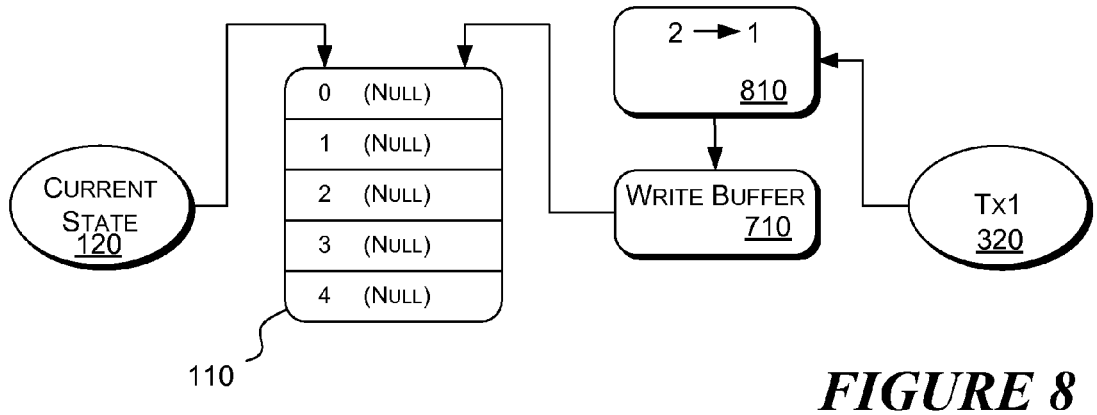

FIG. 8 illustrates the delta pager continuing to process the transaction by adding a second cumulative buffer 810 that points to the first cumulative buffer 710. The delta pager points the transaction pointer 320 to the most recently created write buffer, the second cumulative buffer 810. The delta pager stores the change that transaction 1 200 seeks to apply to the database, setting the value of address 2 to 1, in the second cumulative buffer 810. The second cumulative buffer 810 does not appear to be cumulative because transaction 1 200 so far has attempted only one change.

Figure 9:
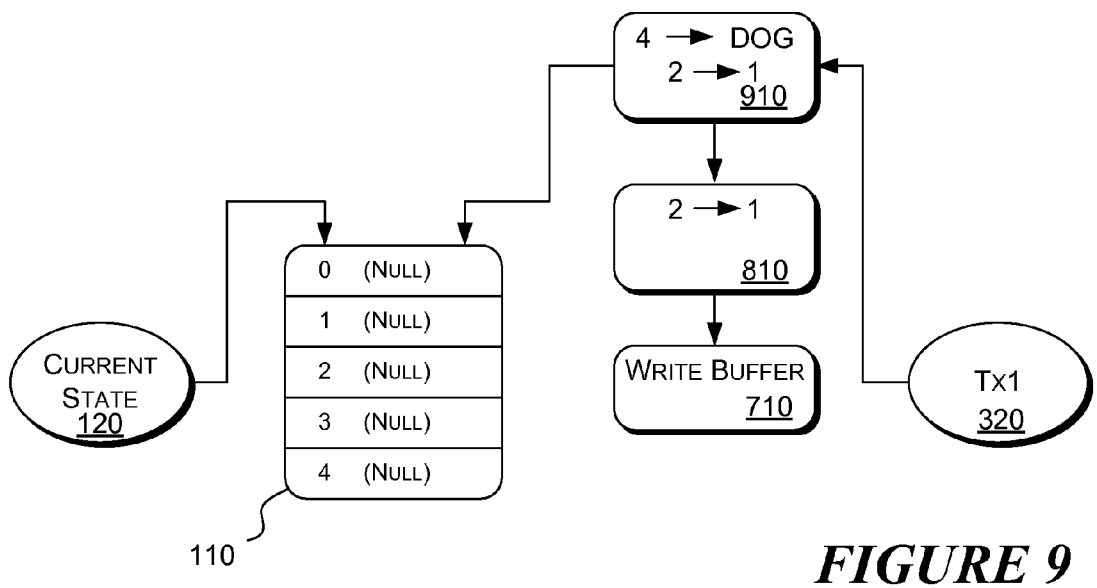

FIG. 9 illustrates the delta pager continuing to process transaction 1 200 by adding a third cumulative buffer 910 that points to the second cumulative buffer 810. The delta pager points the transaction pointer 320 to the most recently created write buffer, the third cumulative buffer 910. The delta pager now stores both changes that transaction 1 200 seeks to apply to the database, setting the value of address 2 to 1, and storing the string "DOG" at address 4.

Figure 10:
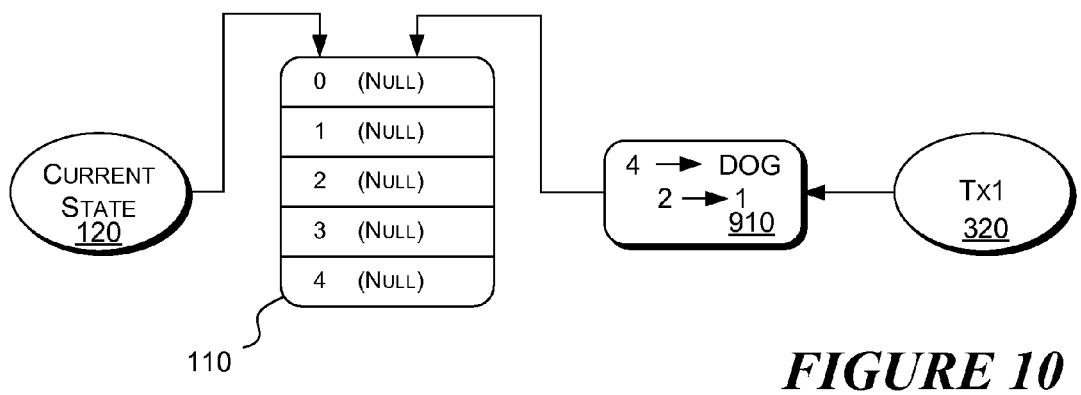
Figure 11:
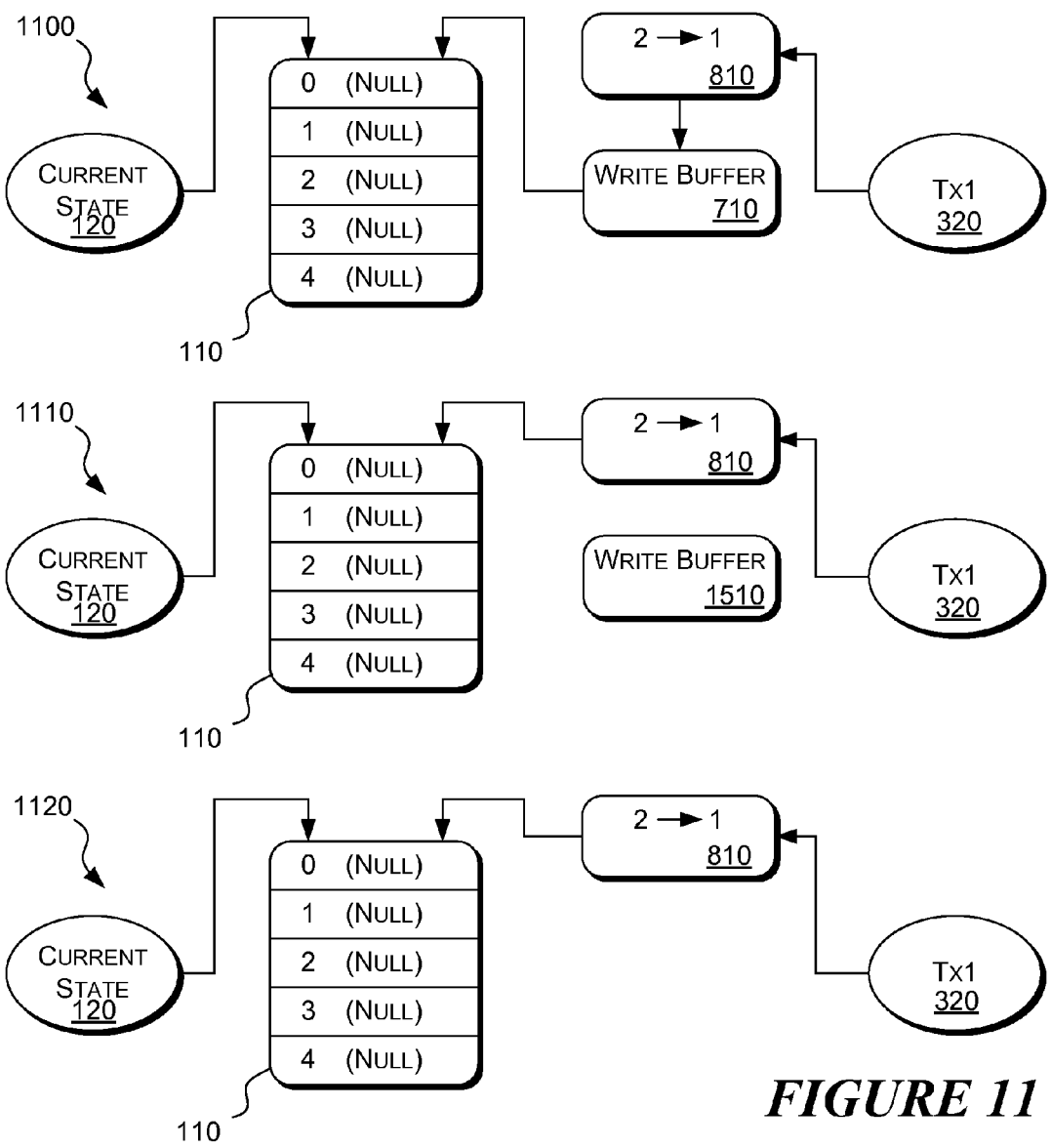

FIGS. 10 and 11 illustrate an advantage of a mode in which the delta pager uses cumulative write buffers. FIG. 10 illustrates that, with all the changes sought by transaction 1 200 stored in the third cumulative buffer 910, a partial mapping of all changes transaction 1 200 would apply to the database is included in a single object, the cumulative write buffer 910. The partial mapping is preserved even if cumulative buffers 710 and 810 are omitted, as in the example of FIG. 10.

According to the immutability invariant, no transaction may interfere with or access an intermediate state of a transaction, thus, write buffers 710 and 810 need not be preserved to maintain the integrity of the state indicated by transaction pointer 320. As a result, there is no need to maintain the cumulative write buffers 710 and 810 after the changes they store are also stored in the most recently created cumulative buffer 910.

Thus, as FIG. 11 illustrates, as the delta pager creates and writes to each new cumulative buffer, the delta pager may discard preceding buffers. A first phase 1100 shows the current state of transaction 1 200 after the first change, setting the value of address 2 to 1, has been written in the second cumulative buffer 810. Because the second cumulative buffer 810 includes any changes stored in the first write buffer 710, in a second phase 1110, the delta pager can point the second cumulative buffer 810 to the state to which the first cumulative buffer 710 pointed, and release the first cumulative buffer 710 and its pointer without changing the state indicated by the transaction pointer 320. The state to which transaction pointer 320 points is shorter because it does not pass through a buffer that includes only a subset of the same data stored in the second cumulative buffer 810. In a third phase 1120, the delta pager may release the memory used to store the first cumulative buffer 710, saving memory for other uses. If the delta pager applied similar phases as shown in FIG. 11 for storing the next change of transaction 1 200, the result would be the same as illustrated in FIG. 10.

Figure 12:
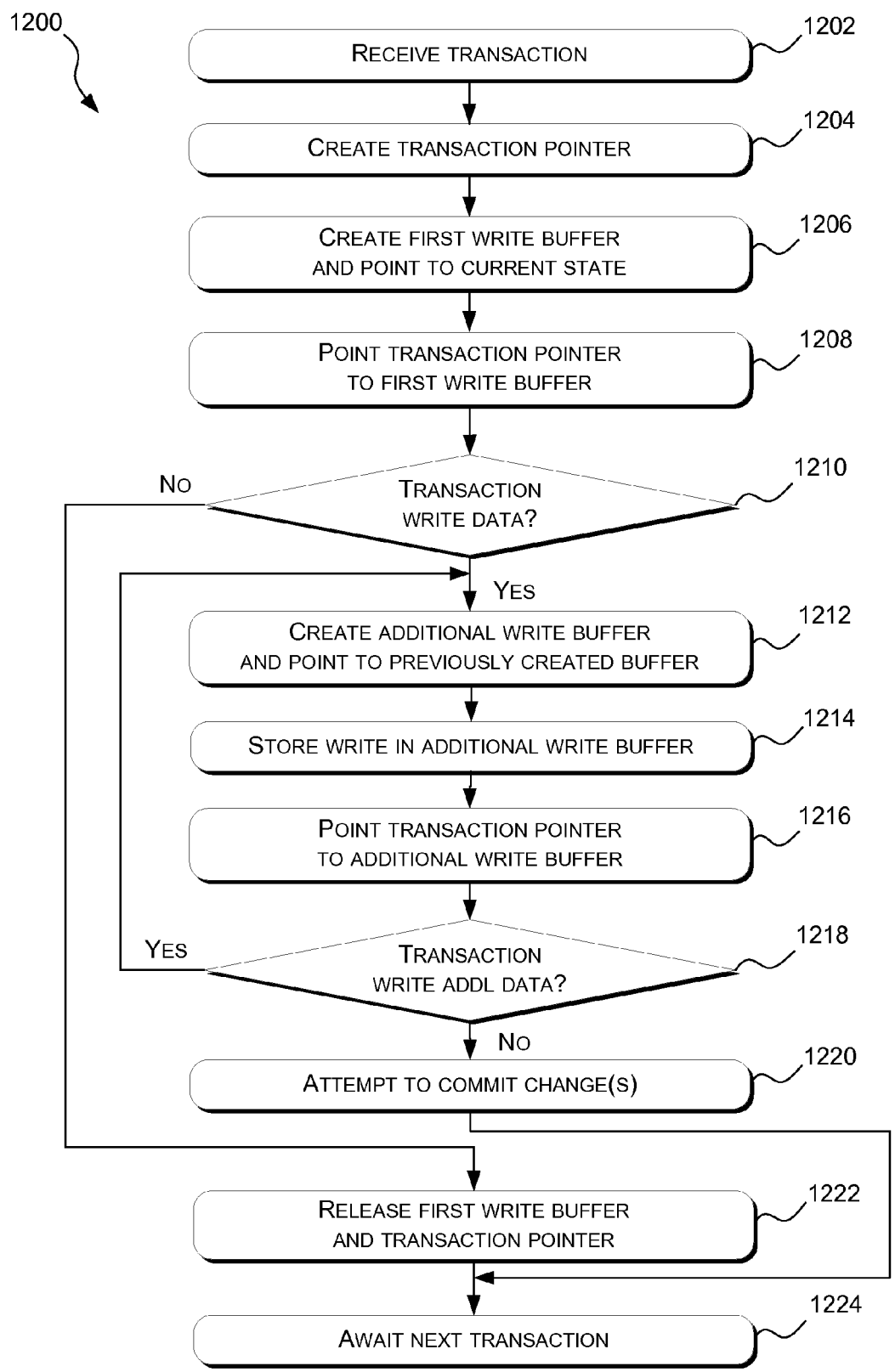
FIG. 12 illustrates a mode of executing a transaction using write buffers.

FIG. 12 illustrates a mode the delta pager uses to process transactions. A flow diagram 1200 begins when block 1202 receives a transaction. Block 1204 creates a transaction pointer that will point to any changes the transaction seeks to apply to the database. Block 1206 creates a first write buffer and points that buffer to a current state existing at the time the transaction is received. Block 1208 points the transaction pointer to the first write buffer which, in turn, points to the current state at the time the transaction was initiated.

Block 1210 determines whether the transaction seeks to apply a change to the database instead of, for example, only reading data from the database. If so, block 1212 creates an additional write buffer and points it to the previously created buffer. The additional write buffers may be single write buffers or cumulative write buffers. If cumulative write buffers are used, in one mode, block 1212 points the additional cumulative buffer to the state to which the previous buffer pointed, and releases the previous buffer as described with reference to FIG. 11.

Block 1214 stores the change the transaction seeks to apply to the database in the additional write buffer. Block 1216 points the transaction pointer to the additional write buffer. Block 1218 determines if the transaction seeks to apply any additional changes to the database. If so, the flow diagram 1200 loops to block 1212, and block 1212 creates an additional buffer. On the other hand, if block 1218 determines that the transaction seeks to apply no additional changes, block 1220 will attempt to commit the changes, as described in a later section. Block 1224, awaits receipt of another transaction On the other hand, if block 1210 determines that the transaction did not seek to apply any changes to the database, block 1222 releases the first write buffer and the transaction pointer because they are not needed. Block 1224 again awaits receipt of another transaction.

Figure 13:
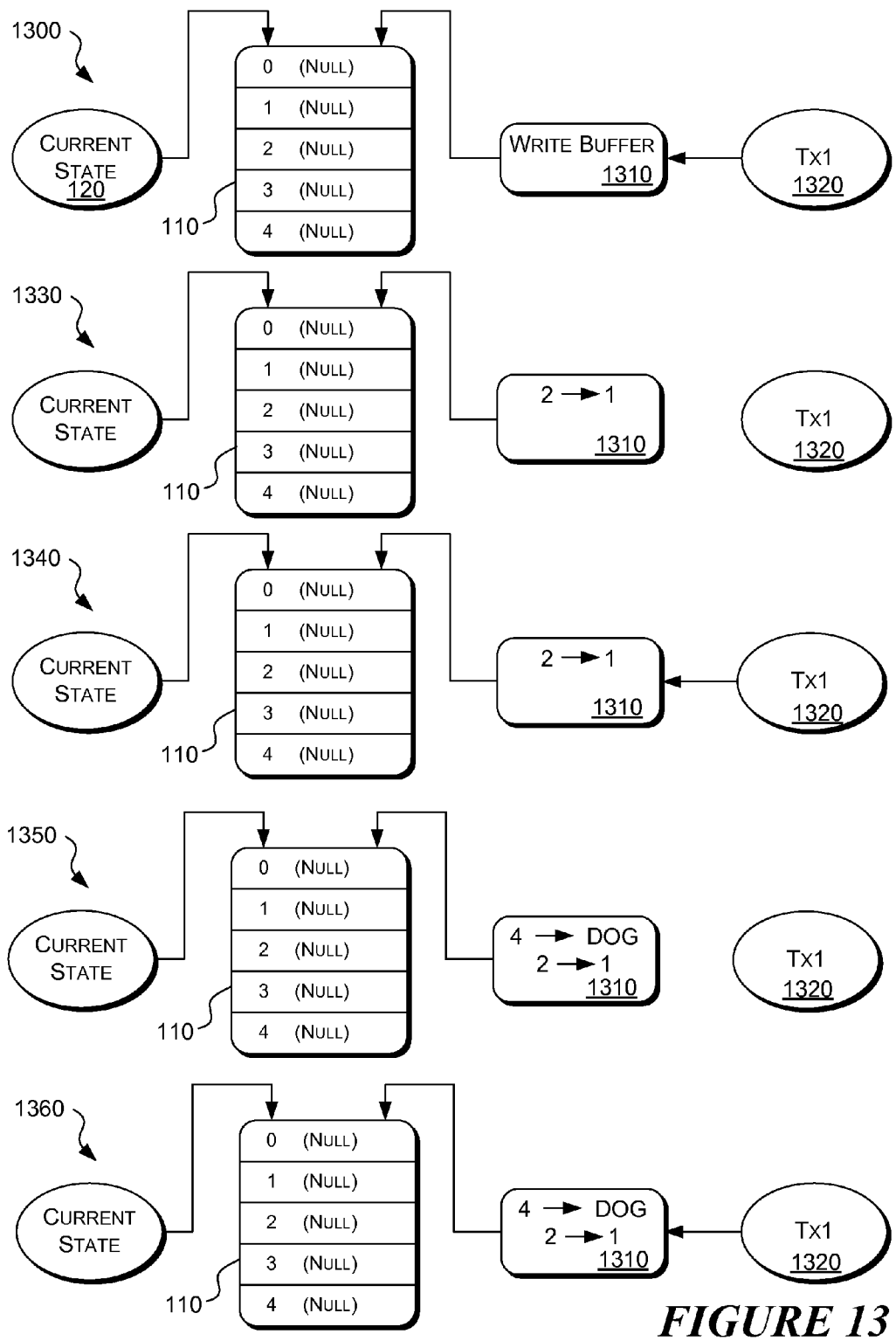
FIG. 13 illustrates the transaction being executed using a single write buffer.

Instead of using a series of cumulative buffers, the delta pager also may use a single, rewriteable write buffer, as illustrated in FIG. 13. In a first phase 1300, the delta pager receives a transaction and creates a single write buffer 1310 and points it to the current state. The delta pager then creates a switching transaction pointer 1320 and points it to the single write buffer 1310. The switching pointer 1320 preserves the immutability of the pointers in the delta pager, as described below. Overwriting or rewriting a buffer in this manner preserves the immutability invariant recognized by the delta pager using a single, cumulative buffer to store changes the transaction seeks to apply instead of using multiple buffers to store each of the changes.

In a second phase 1330 of using a single write buffer 1310, the delta pager points the switching pointer 1320 away from the single write buffer 1310, and updates the single write buffer with a change or additional change indicated by the transaction. As previously described, the delta pager preserves the immutability of all pointers. Thus, technically, if the switching pointer continued to point to the single write buffer 1310 as it writes changes to the buffer 1310, the immutability invariant would be violated: the state pointed to by the switching pointer would be seen to mutate. Thus, in one mode, the delta pager uses the switching pointer 1320 that it can point away from the single write buffer 1310.

In a third phase 1340, once the delta pager has updated the single write buffer, the delta pager points the switching pointer 1320 back to the single write buffer 1310 to maintain the partial mapping of changes the transaction seeks to apply to the database. In a fourth phase 1350, the delta pager once again points the switching pointer 1320 away from the single write buffer 1310, and updates the single write buffer to add another change indicated by the transaction. In a fifth phase 1360, once the delta pager has added the additional change to the single write buffer, the delta pager again points the switching pointer 1320 back to the single write buffer 1310 to maintain the partial mapping.

Note that the delta pager need not literally use a switching pointer 1320 that actually is pointed away from the buffer 1310. To illustrate that the immutability invariant is logically preserved, the delta pager is described as using rewritable buffers indicated by a switching pointer 1320. Alternatively, if the rewrite occurs atomically so that no part of the system dereferences the pointer while the rewrite occurs, then an ordinary transaction pointer 320 may be used instead, for the invariant is still effectively preserved: a pointer is not a pointer if no one is observing its value. Hence in this limited case, the delta pager uses rewriting-in-place because it preserves the immutability invariant.

Figure 14:
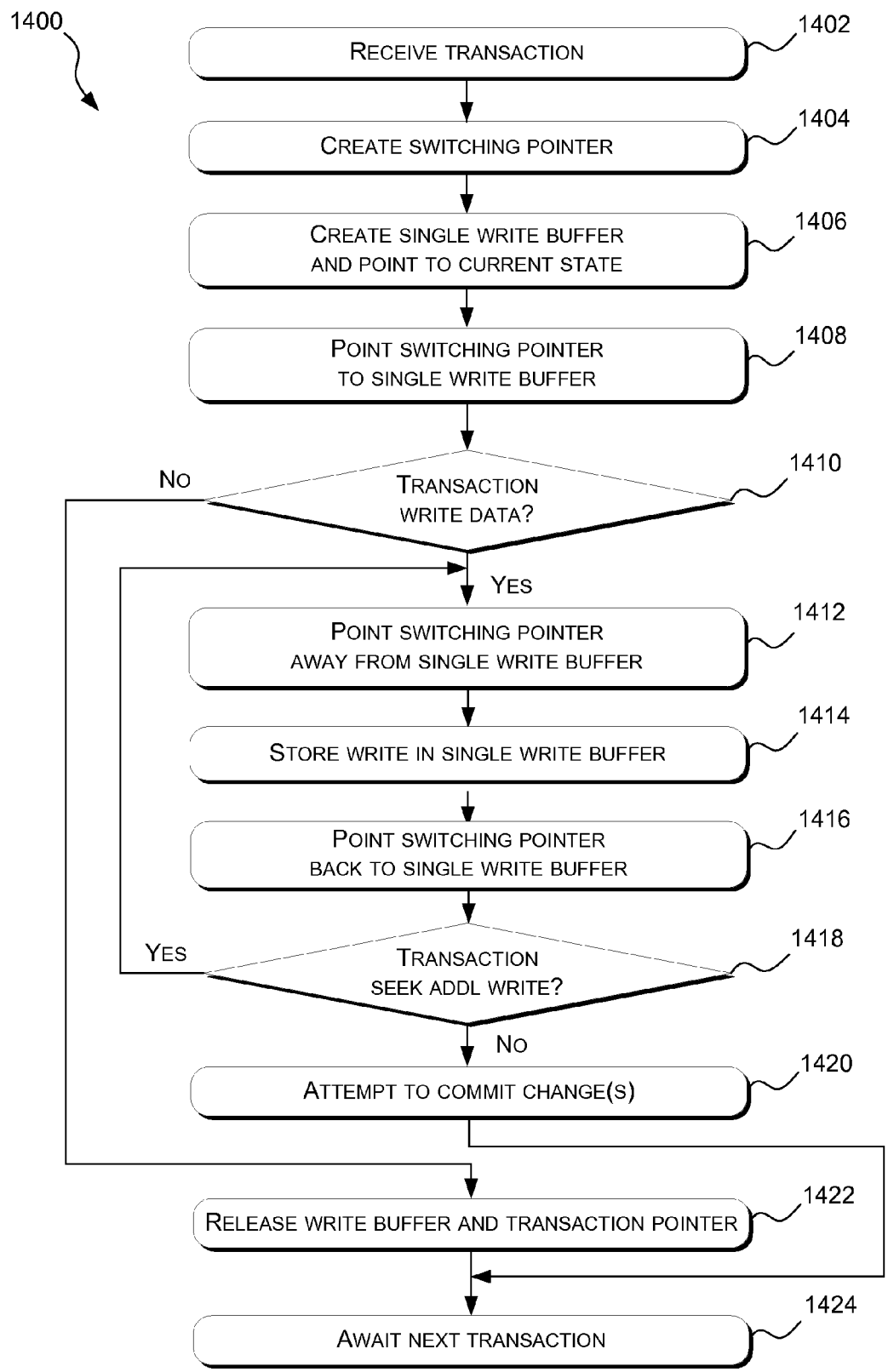
FIG. 14 illustrates a mode of executing a transaction using a single write buffer.

FIG. 14 illustrates the mode depicted in FIG. 13 that the delta pager uses to process transactions by using a single write buffer. A flow diagram 1400 begins when block 1402 receives a transaction. Block 1404 creates a switching pointer that will indicate a partial mapping of changes the transaction seeks to apply to the database. Block 1406 creates a single write buffer and points that buffer to a current state at the time the transaction is received. Block 1408 points the switching pointer to the single write buffer to indicate the partial mapping the transaction seeks to apply to the database.

Block 1410 determines whether the transaction seeks to apply a change to the database. If so, block 1412 points the switching pointer away from the single write buffer. Block 1414 stores the change to the single write buffer. As illustrated in FIG. 13, the single write buffer is cumulative, thus, a plurality of changes may be added to the single write buffer. Block 1416 points the switching pointer back to the single write buffer.

Block 1418 determines if the transaction seeks to apply any additional changes to the database. If so, the flow diagram 1400 loops to block 1412, and block 1412 creates an additional buffer. On the other hand, if block 1418 determines that the transaction seeks to apply no additional changes, block 1420 will attempt to commit the changes, as described in a later section. Block 1424, awaits receipt of another transaction On the other hand, if block 1410 determined that the transaction did not seek to apply any changes to the database, block 1422 releases the single write buffer and the switching pointer because they are not needed. Block 1424 awaits receipt of another transaction.

Committing Transactions

The delta pager supports different modes for determining when to commit transactions. The delta pager allows multiple transactions to concurrently access the state of the database existing at the time each transaction was initiated. However, when multiple transactions run concurrently, the first to be committed to the database may change the state of the database on which other concurrently-executing transactions rely. Transactions based on an outdated or superseded state of the database may lead to invalid results if committed to the database. Thus, the delta pager commits a current transaction only when intervening transactions have not interfered with the state of the database on which the current transaction relied.

Figures 15, 16:
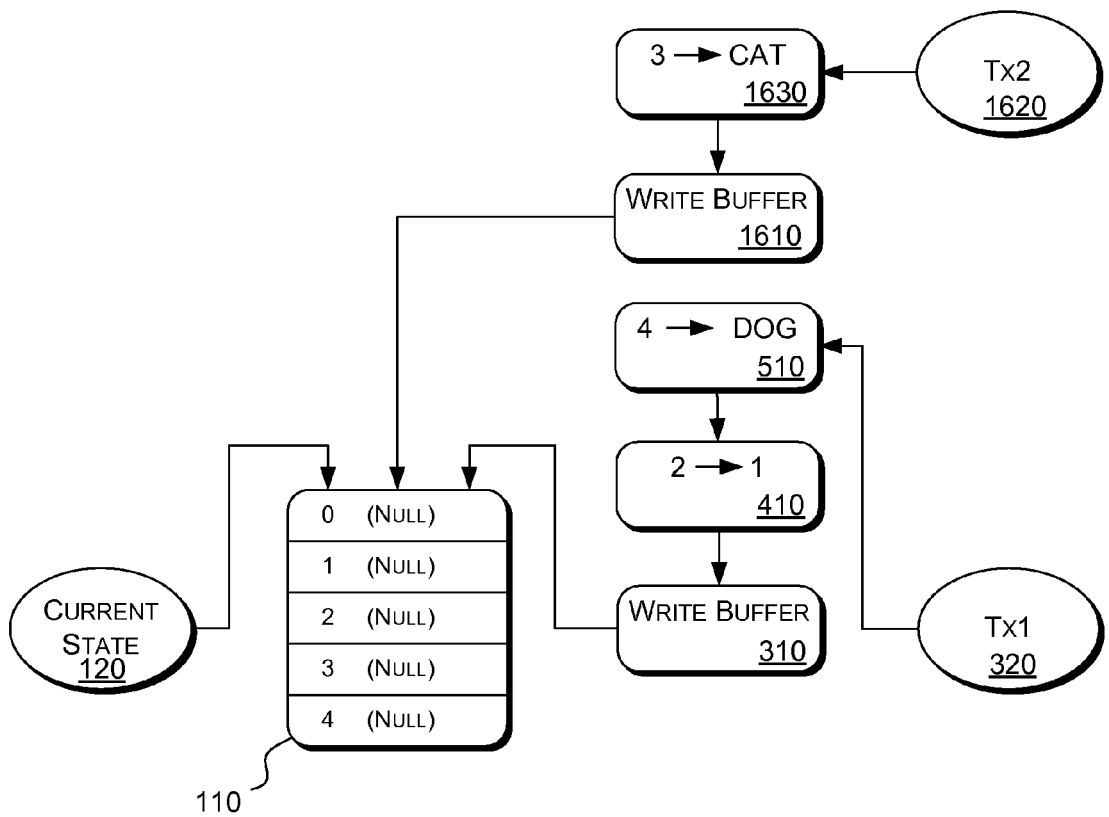
FIG. 15 illustrates a second transaction being executed against the database while the first transaction is executed as an intervening transaction.
FIGS. 16-20 illustrate commitment and abortion of a current transaction in the wake of an intervening transaction.

FIG. 15 illustrates a second transaction, transaction 2 (Tx2) 1500, that the delta pager processes at the same time as transaction 1 200, resulting in potentially conflicting transactions. In the face of potentially conflicting transactions, the delta pager determines which transactions to commit to the database and which transactions to abort. Transaction 2 1500 invokes a plurality of instructions 1510-1570. Some of the instructions, such as instruction 1 1520, "x=Read(0)," seek to read data from the database, whereas other instructions, such as instruction 4 1550, "Write (3, "CAT")," seek to apply a change to the database.

FIG. 16 illustrates a situation in which the delta pager receives and concurrently processes both transaction 1 200 and transaction 2 1500. Either of the two transactions may have been initiated before the other, before either transaction has been committed to the database. Both transactions were initiated as the current state pointer 120 continues to point to the original state 110, the current state at the time.

The delta pager initiates transaction 1 200 as previously described, by creating the first write buffer 310 that points to the original state 110 indicated by the current state pointer 120, and creates a transaction pointer 320 that points to the most recently created write buffer for the transaction. The delta pager creates additional write buffers 410 and 510 that store changes that transaction 1 200 seeks to make to the database.

For transaction 2 1500, the delta pager creates a first write buffer 1610 that points to the original state 110 and a transaction pointer 1620 to indicate the most recently created write buffer for the transaction. Similarly, the delta pager creates additional write buffers for transaction 2 1500. In FIG. 16, instruction 1 1520, "x=Read(0)," and instruction 2 1530, "y=Read(1)," both read null values from the original state 110. Thus, a conditional instruction 3 1540, "If y=x then" is true, and instruction 4 1550, "Write (3,"CAT")" executes. The delta pager creates an additional write buffer 1630 that points to the first write buffer 1610, stores the change indicated by instruction 4 1550 in the additional write buffer 1630, and points the transaction pointer 1620 to the additional write buffer 1630. Both the transaction pointer 320 and the transaction pointer 1620 point to partial mappings including changes that each transaction would apply to the database.

Transaction 1 200 and transaction 2 1500 may make conflicting changes to the database, or a conditional instruction, such as instruction 3 1540, may depend on data that another transaction potentially changes. Modes of the delta pager account for these potential conflicts in different ways.

Aborting Transactions when Intervening Transactions Change the Current State

Figure 17:
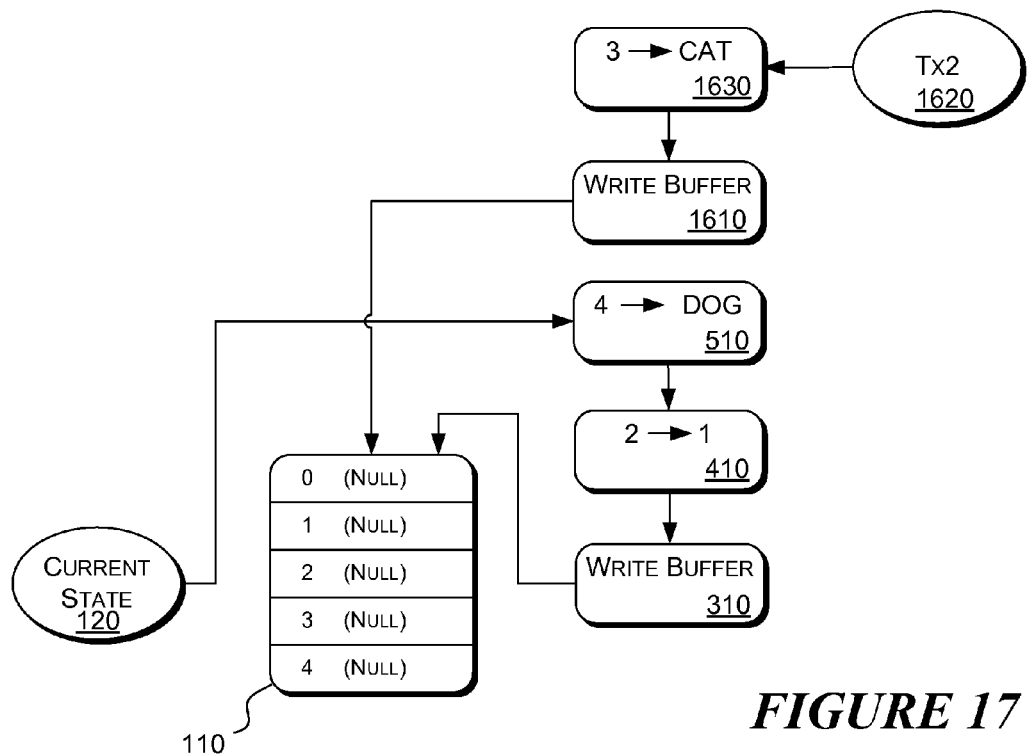
Figure 18:
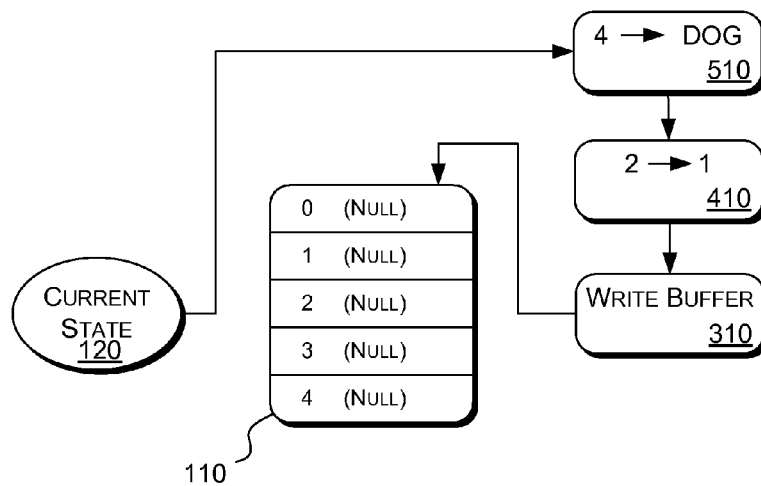

FIGS. 17 and 18 illustrate one mode the delta pager uses to handle potentially conflicting transactions: by aborting a transaction after the delta pager has committed an intervening transaction that changes the state of the database. In FIG. 17, the delta pager has committed transaction 1 200 to the database as previously described with regard to FIG. 6: the transaction pointer 320 is removed, and the current state pointer 120 is switched to point to the last write buffer 510 created for the transaction. After committing transaction 1 200 to the database, the delta pager determines that transaction 2 1500 has completed execution and seeks to commit to the database.

In determining whether to commit transaction 2 1500 to the database, the delta pager determines whether an intervening transaction such as transaction 1 200 has changed the state of the database that existed at the time the current transaction, transaction 2 1500, was initiated. To make this determination, the delta pager compares the state of the database at the time transaction 2 1500 was initiated by determining to what state the first write buffer 1610 points. The delta pager then compares it to the current state of the database to which the current state pointer 120 points. In other words, the delta pager compares the current state pointer 120 with the transaction pointer 1620 and inserted write buffers 1610 and 1630 to determine if they both point to the same object. After committing transaction 1 200 to the database, the delta pager determines that the current state pointer 120 points to write buffer 510, while transaction 2 1500, through its first write buffer 1610, points to the original state 110.

Because transaction 2 1500 points to a state other than the current state indicated by current state pointer 120, the delta pager aborts transaction 2 1500. FIG. 18 shows that the delta pager aborts transaction 2 1500 by deleting write buffers 1610 and 1630 and the transaction pointer 1620 to free memory that will not become part of the current state of the database.

Aborting the transaction for any change in the current state is a risk-averse approach to avoid committing conflicting transactions. As in the example of FIGS. 16-18, transaction 1 200 did not change any values in the state of the database that existed when transaction 2 1500 executed. However, it is possible that intervening transaction 1 200 may have changed data on which transaction 2 1500 relied. Transaction 1 200 changed the current state of the database and, thus, may have changed data on which transaction 2 1500 relied.

Figure 19:
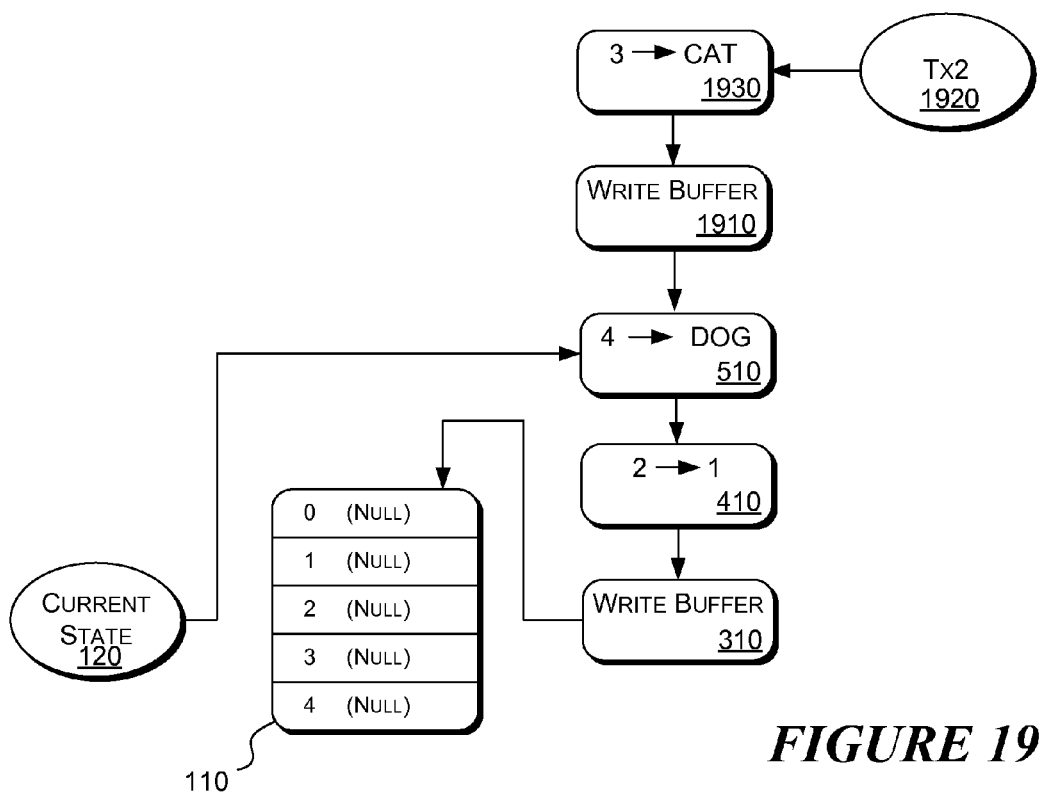
Figure 20:
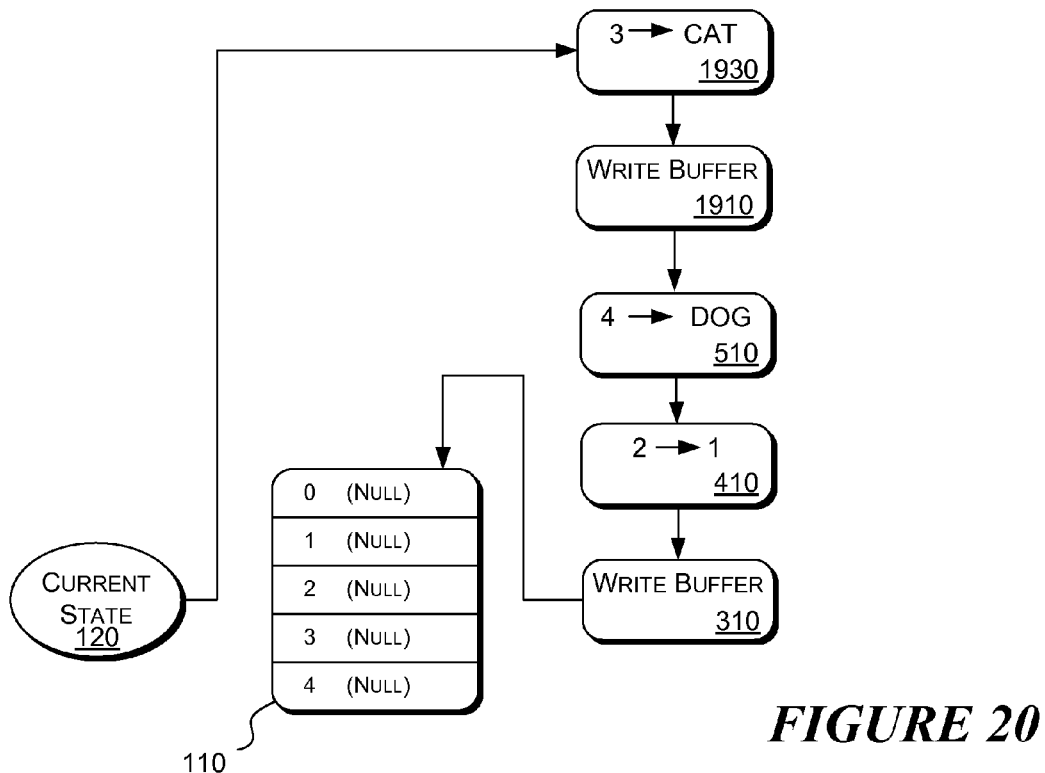

Although transaction 2 1500 was aborted, the transaction may be reinitiated as illustrated in FIGS. 19 and 20. In FIG. 19, the delta pager initiates transaction 2 1500 after transaction 1 200 commits. Thus, when transaction 2 1500 is initiated, the delta pager creates a first write buffer 1910 that points to the state existing at the time transaction 2 1500 is reinitiated. The state is indicated by current state pointer 120, which points to write buffer 510 added to the state by transaction 1 200. The delta pager then creates a transaction pointer 1920 that originally pointed to write buffer 1910. The delta pager adds an additional write buffer 1930 to which the delta pager stores a change that transaction 2 1500 seeks to apply to the database, then the delta pager changes the transaction pointer 1920 to point to the additional write buffer 1930 to indicate the partial mapping indicating the changes that transaction 2 1500 seeks to apply to the database.

This time, when the delta pager determines that transaction 2 1500 is complete and seeks to commit the transaction to the database, the delta pager finds that no intervening transaction has changed the current state of the database from the state on which transaction 2 1500 relied. The transaction pointer 1920, through write buffers 1930 and 1910, points to write buffer 510. The current state pointer still points to write buffer 510, thus, the transaction pointer 1920 still points to the current state.

FIG. 20 shows the delta pager committing transaction 2 1500 to the database. The delta pager changes the current state pointer 120 to point to the last buffer added by transaction 2 1500, write buffer 1930. The delta pager then deletes the transaction pointer 1920. The current state to which the current state pointer now points includes the original state 110 as modified by the changes stored in write buffers 410 and 510 applied by transaction 1 200 and write buffer 1930 applied by transaction 2 1500.

Figure 21:
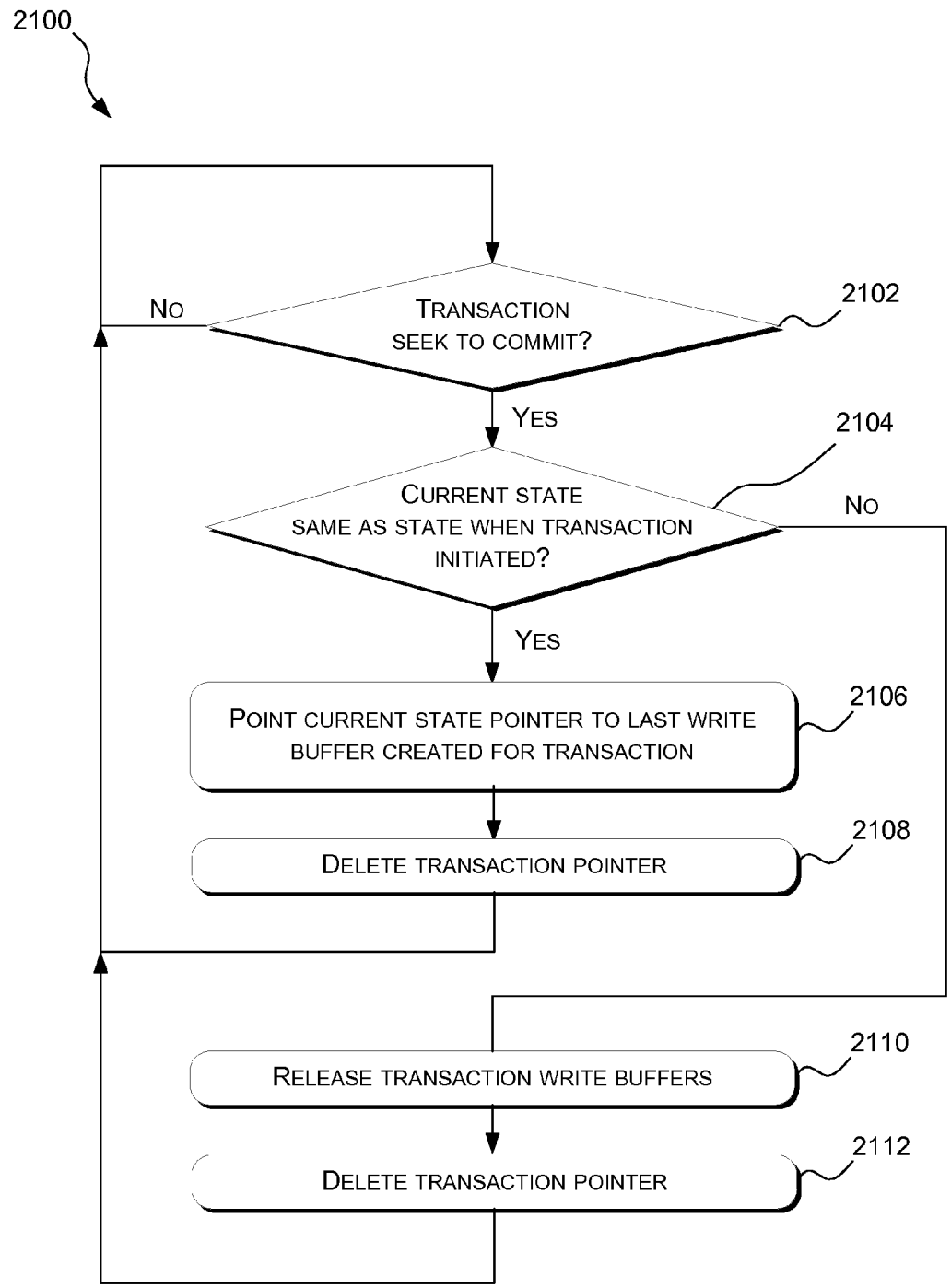
FIG. 21 illustrates a mode of determining when to commit or abort a transaction in the wake of an intervening transaction.

FIG. 21 illustrates this first mode the delta pager uses to determine whether to commit or abort transactions. A flow diagram 2100 begins at block 2102. Block 2102 determines when a completed transaction seeks to commit to the database, and the flow diagram 2100 loops to block 2102 until a transaction seeks to commit to the database. When block 2102 detects a completed transaction that seeks to commit, block 2104 determines whether the current state is the same as the state existing when the transaction was initiated as indicated, for example, by the transaction pointer for current transaction. In other words, block 2104 determines if the first write buffer created for the transaction points to the same state to which the current state pointer points. If so, block 2106 points the current state pointer to the last buffer created for the transaction, which is the buffer to which the transaction pointer also points, completing the updating of the database as a result of the transaction being committed. Block 2108 deletes the transaction pointer, freeing the associated memory. The flow diagram 2100 loops to block 2102 to detect the next completed transaction seeking to commit to the database.

On the other hand, if block 2104 determines that the current state is not the same as the state existing when the transaction was initiated, block 2104 determines that the current state has changed. Block 2110 releases the transaction's write buffers. Block 2112 deletes the transaction pointer, completed the abortion of the transaction. As previously stated, an aborted transaction may be reinitiated, and the delta pager will determine whether the transaction should be committed to the database when the transaction is complete and seeks to commit.

Read Buffers to Prevent Transactions from being Aborted Unnecessarily

Instead of the delta pager aborting a current transaction whenever the transaction points to a state that does not match the current state, the delta pager may instead abort the current transaction when an intervening transaction has written data that the current transaction has read. Aborting a current transaction whenever the current state has changed ensures that no conflicting changes are applied to the database. However, when there may be many transactions executing at one time, and some of these transactions may involve lengthy or complex computations, aborting transactions wastes computing resources. Thus, if an intervening transaction did not access or change any data that a current transaction read or relied upon, it is not necessary that the delta pager abort the current transaction.

A mode of the delta pager creates a read buffer for each transaction. A read buffer tracks any data that the transaction accesses. When a completed transaction attempts to commit to the database, but finds that an intervening transaction has changed the state of the database, the delta pager can compare the read buffer with the current state of the database to determine whether it is necessary to abort the current transaction. In another mode, the delta pager aborts the current transaction when the current state has changed and an intervening transaction has changed or overwritten data the current transaction has read. In this mode, the delta pager may abort the transaction if the intervening transaction wrote data to an address read by the current transaction, or the delta pager may compare the actual data read by the current transaction with the data written by the intervening transaction to determine if the value of the data actually changed.

Figure 22:
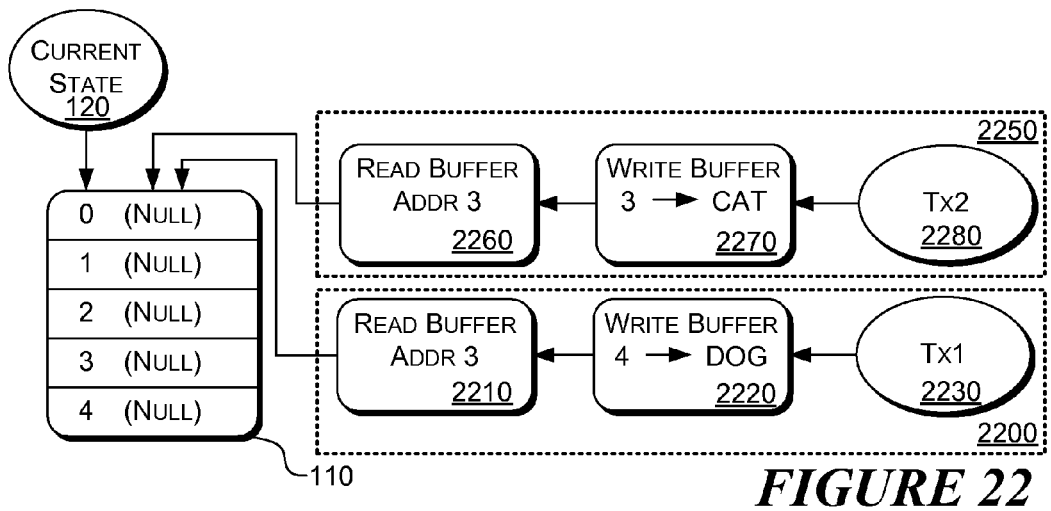
FIGS. 22-27 illustrate potentially competing transactions being executed and committed to the database using read and write buffers.
Figure 23:
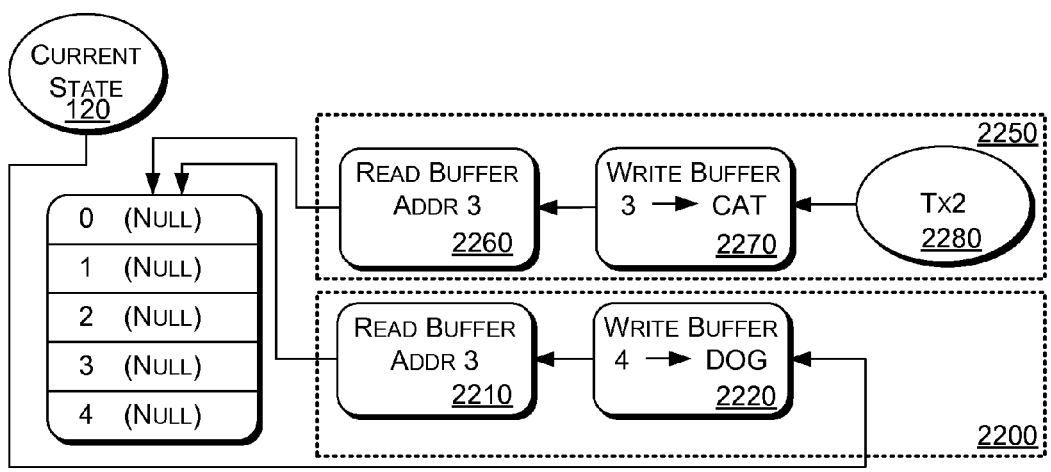
Figure 24:
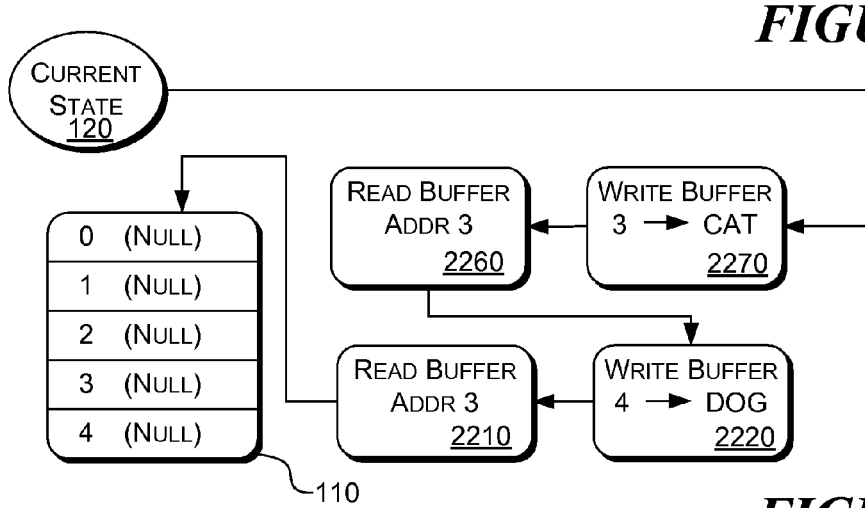

FIGS. 22-24 illustrate a mode of the delta pager that uses read buffers and aborts a transaction when an intervening transaction has written data read by the current transaction. FIG. 22 shows two transactions, transaction 1 2200 and transaction 2 2250, executing against a current state of a database. The current state pointer 120 points to the original state 110, thereby indicating the current state or current state of the database. For transaction 1 2200, the delta pager creates a read buffer 2210, a write buffer 2220, and a transaction pointer 2230. As previously described, the delta pager may create one or more write buffers for each transaction. The delta pager also may create more than one read buffer, if the read buffers are limited in size or for other reasons. The delta pager points the read buffer 2210 to the current state, points the write buffer 2220 to the read buffer 2210, and points the transaction pointer 2230 to the write buffer 2220. Correspondingly, for transaction 2 2250, the delta pager creates a read buffer 2260, a write buffer 2270, and a transaction pointer 2280. The delta pager points the read buffer 2260 to the current state, points the write buffer 2270 to the read buffer 2260, and points the transaction pointer 2280 to the write buffer 2270.

The read buffer 2210 for transaction 1 2200 indicates that transaction 1 2200 has read the data at address 3. The read buffer 2260 for transaction 2 2250 indicates that transaction 2 2250 also has read the data at address 3. However, even though each of the transactions has read the same data, neither of the transactions seeks to change the data at that address. Thus, the delta pager is not compelled to abort either of the transactions.

A read buffer, like an empty write buffer, does not change the state of the database. Accordingly, embodiments of the delta pager may employ a read buffer that is not in a current state of the database as though it were an object in which data is stored. Instead, the delta pager may be stored outside the partial mapping that the delta pager may create to store changes the transaction seeks to apply. The read buffer may be stored in a separate location, and the transaction pointer may maintain a separate pointer to indicate the read buffer's location.

If the delta pager will abort the current transaction only when an intervening transaction changes data at an address read by the current transaction, the read buffer should store the address and the value read, as described below with reference to FIGS. 25-27. On the other hand, if the delta pager will abort the transaction if an intervening transaction overwrote data that was read by the current transaction, even if the intervening transaction wrote the same value, then the read buffer only need include the address or addresses the transaction reads, as illustrated in FIGS. 22-24.

FIG. 23 illustrates a state of the database after the delta pager commits transaction 1 2200 to the database. The delta pager changes the current state pointer 120 to point to the last write buffer 2220 created for transaction 1 2200 and deletes the transaction pointer 2230. Once transaction 2 2250 is complete, the delta pager determines whether it should commit transaction 2 2250. Again, because the current state of the database changed before the delta pager has committed transaction 2 2250, in the mode of determining whether to commit transactions previously described with reference to FIGS. 15-21, the delta pager would abort transaction 2 2250. The current mode, by contrast, makes a more substantive assessment.

In this mode, even though the current state of the database has changed, the delta pager does not abort the current transaction unless an intervening transaction has written data to an address accessed by the current transaction. The delta pager compares the read buffer 2260 of transaction 2 2250 to determine whether the intervening transaction, transaction 1 2200, has written to an address from which transaction 2 2250 read data, thereby changing the state on which the processing of transaction 2 2250 relied. Transaction 2 2250, according to the read buffer 2260, only read data from address 3. Checking the current state indicated by the current state pointer 120, however, transaction 1 2200, according to write buffer 2220, only wrote data to address 4. Thus, the delta pager commits transaction 2 2250 to the database.

FIG. 24 illustrates the delta pager committing transaction 2 2250 to the current state of the database. The delta pager points the read buffer 2260 of transaction 2 2250 to the object indicated by the current state pointer, write buffer 2220 of transaction 1 2200. The delta pager then changes the current state pointer 120 to point to the write buffer 2270 of transaction 2 2250, committing transaction 2 2250 to the database.

Figure 25:
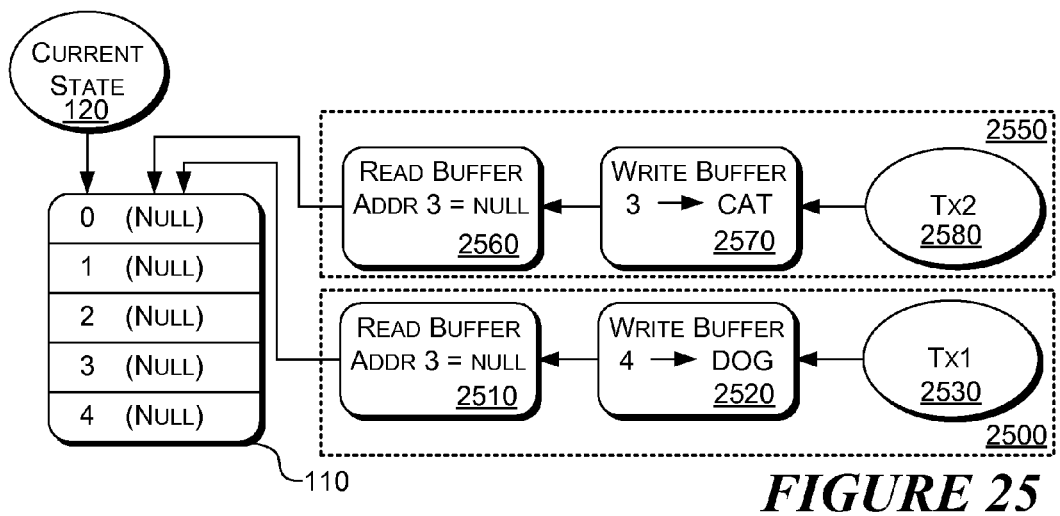
Figure 26:
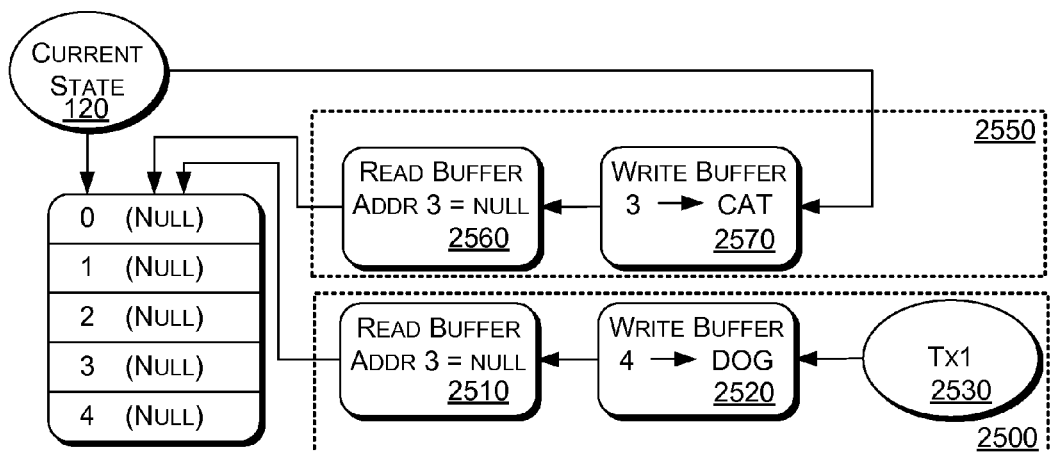
Figure 27:
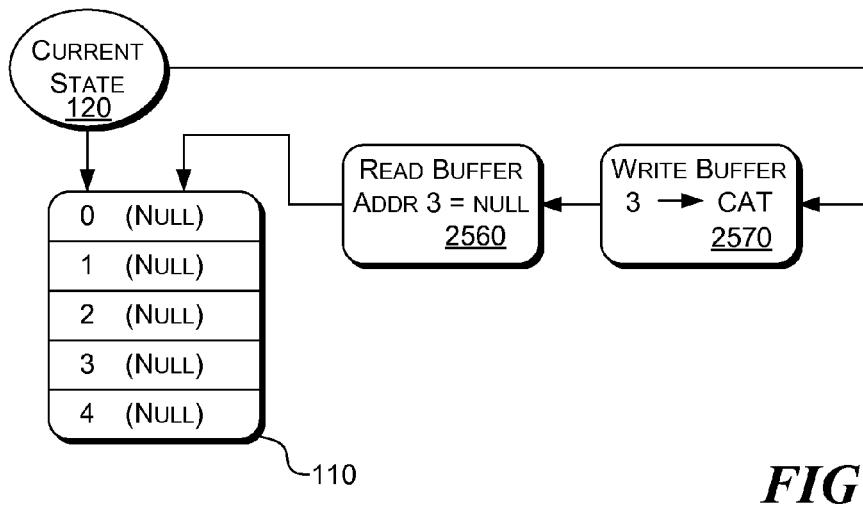

FIGS. 25-27 illustrate a less risk-averse mode in which the delta pager only aborts a current transaction when an intervening transaction not only writes to an address to which an intervening transaction wrote data, but where the intervening transaction actually changes the data value that the current transaction read. FIG. 25 shows two transactions, transaction 1 2500 and transaction 2 2550, executing against a current state of a database. The current state is indicated by the current state pointer 120, which points to the original state 110 of the database. For transaction 1 2500, the delta pager creates a read buffer 2510, a write buffer 2420, and a transaction pointer 2530. The delta pager points the read buffer 2510 to the current state at that time, points the write buffer 2520 to the read buffer 2510, and points the transaction pointer 2230 to the write buffer 2520. Correspondingly, for transaction 2 2550, the delta pager creates a read buffer 2560, a write buffer 2570, and a transaction pointer 2580. The delta pager points the read buffer 2560 to the current state at that time, points the write buffer 2570 to the read buffer 2560, and points the transaction pointer 2580 to the write buffer 2570.

The read buffer 2510 for transaction 1 2500, in contrast to the example of FIGS. 22-24, indicates that transaction 1 2500 read the value of address 3, and that the value read from address 3 was null. The read buffer 2560 for transaction 2 2550 indicates that transaction 2 2500 also read the value of address 3 and also found that the value read from address 3 was null. The write buffer 2570 for transaction 2 2550 stores a change to the value of address 3, changing the stored value to the string "CAT."

FIG. 26 illustrates the current state of the database after the delta pager commits transaction 2 2550 to the database. Accordingly, the delta pager changes the current state pointer 120 to point to the write buffer 2570 storing any changes that transaction 2 2550 applies to the database, and discards transaction pointer 2580. In this mode, once transaction 1 2500 is complete, the delta pager determines whether transaction 1 2500 read data that transaction 2 2550 changed.

The delta pager compares the read buffer 2510 of transaction 1 2510 with the current state of the database indicated by the current state pointer 120. According to the read buffer 2510, transaction 1 read address 3 and found the value to be null. The delta pager also follows the current state of the database indicated by the current state pointer 120 and finds that transaction 2 2550 changed the value stored at address 3 to "CAT." Thus, any changes transaction 1 2500 seeks to apply to the database may have been based on data that is now out of date.

Accordingly, the delta pager aborts transaction 1 2500 as illustrated in FIG. 27. The delta pager releases or deletes the read buffer 2510, the write buffer 2520, and the transaction pointer 2530, and the delta pager leaves the current state pointer 120 pointed to the write buffer 2570 storing changes transaction 2 2550 applied to the database. If desired, transaction 1 2200 subsequently may be reinitiated, as previously described.

Note that even though transaction 2 2550 wrote a new value to an address read by transaction 1 2500, the data that transaction 2 2250 wrote may not have changed the result of transaction 1 2500. However, to determine whether the result of transaction 1 2500 would change as a result of the data written by transaction 2 2550, transaction 1 2500 would have to be re-executed. This mode of the delta pager does not abort transaction 1 2500 just because the current state changed, but provides some substantive analysis of whether it should abort the current transaction short of taking the time to rerun transaction 1 2550.

Figure 28:
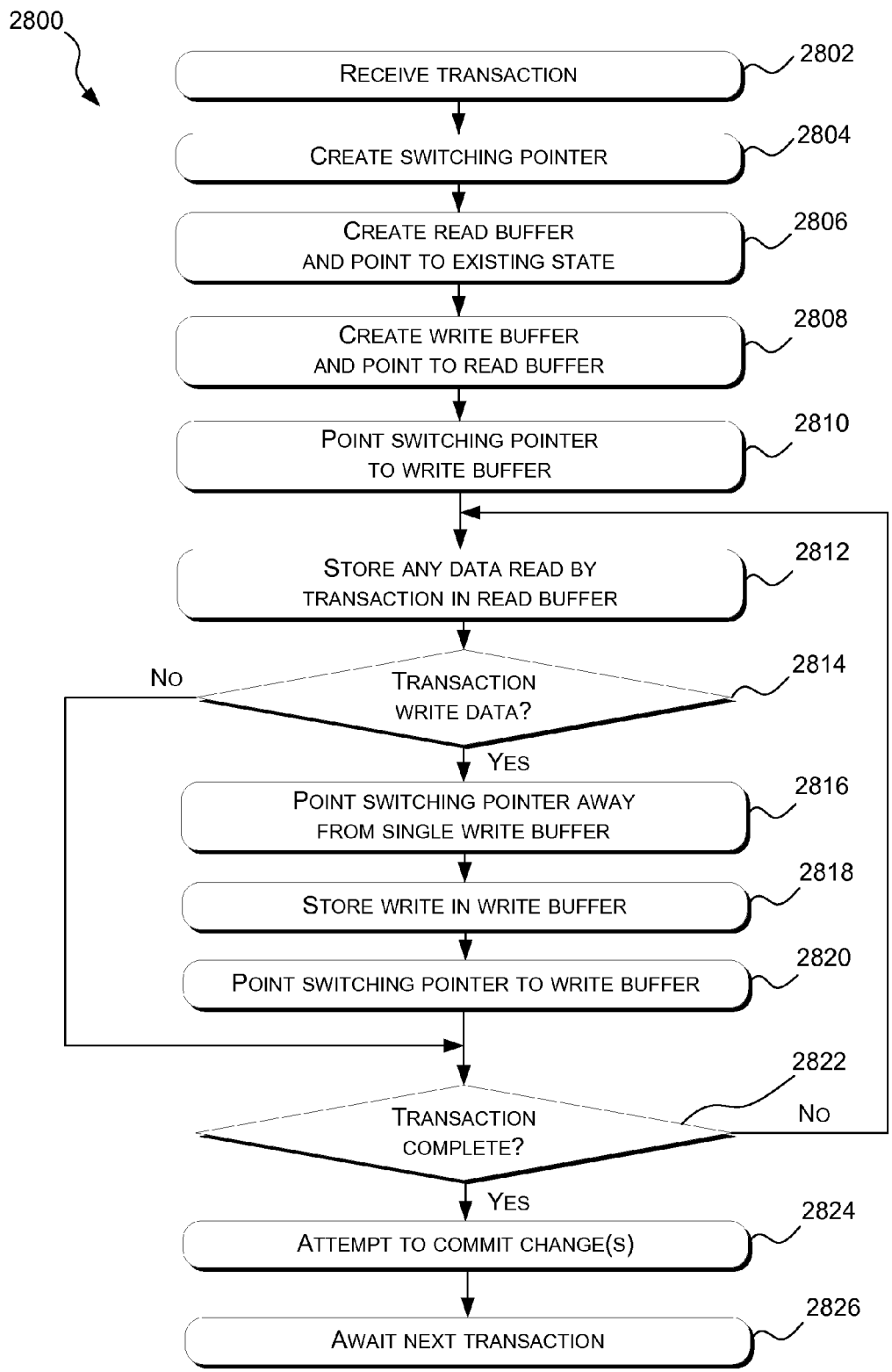
FIG. 28 illustrates a mode of executing a transaction using read and write buffers.

FIG. 28 illustrates a mode the delta pager uses to process transactions by creating a read buffer and a single write buffer to facilitate the more substantive modes of determining whether the delta pager should commit a transaction. The delta pager is not restricted to using a single write buffer in conjunction with using a read buffer, and the choice of a single write buffer is only one possible alternative.

A flow diagram 2800 begins when block 2802 receives a transaction. Block 2804 creates a switching pointer that will indicate a partial mapping of the changes the transaction seeks to apply to the database. Block 2806 creates a read buffer and points it to the state existing at the time the transaction was initiated. Block 2808 creates a single write buffer and points the single write buffer to the read buffer. Block 2810 points the switching pointer to the single write buffer to indicate the partial state of the changes the transaction seeks to apply.

Block 2812 stores any data read by the transaction in the read buffer. As previously described, in a mode where the delta pager may abort a transaction if an intervening transaction has read the same data as the current transaction, the read buffer need only store the address of the data read. On the other hand, if the delta pager determines whether to commit the transaction based on whether an intervening transaction wrote data that was read by the current transaction, the read buffer should store both the address and the data read from that address.

Block 2814 determines whether the transaction seeks to apply a change to the database. If so, block 2816 points the switching pointer away from the single write buffer. Block 2818 stores the change to the single write buffer. Block 2820 points the switching pointer back to the single write buffer.

Block 2822 determines if the transaction is complete or continues to execute. If the transaction is not complete, the flow diagram 2800 loops to block 2812 to store any data read by the transaction in the read buffer. On the other hand, if block 2822 determines that the transaction is complete, block 2824 will attempt to commit the changes made by the transaction. Block 2826 awaits receipt of another transaction.

Figure 29:
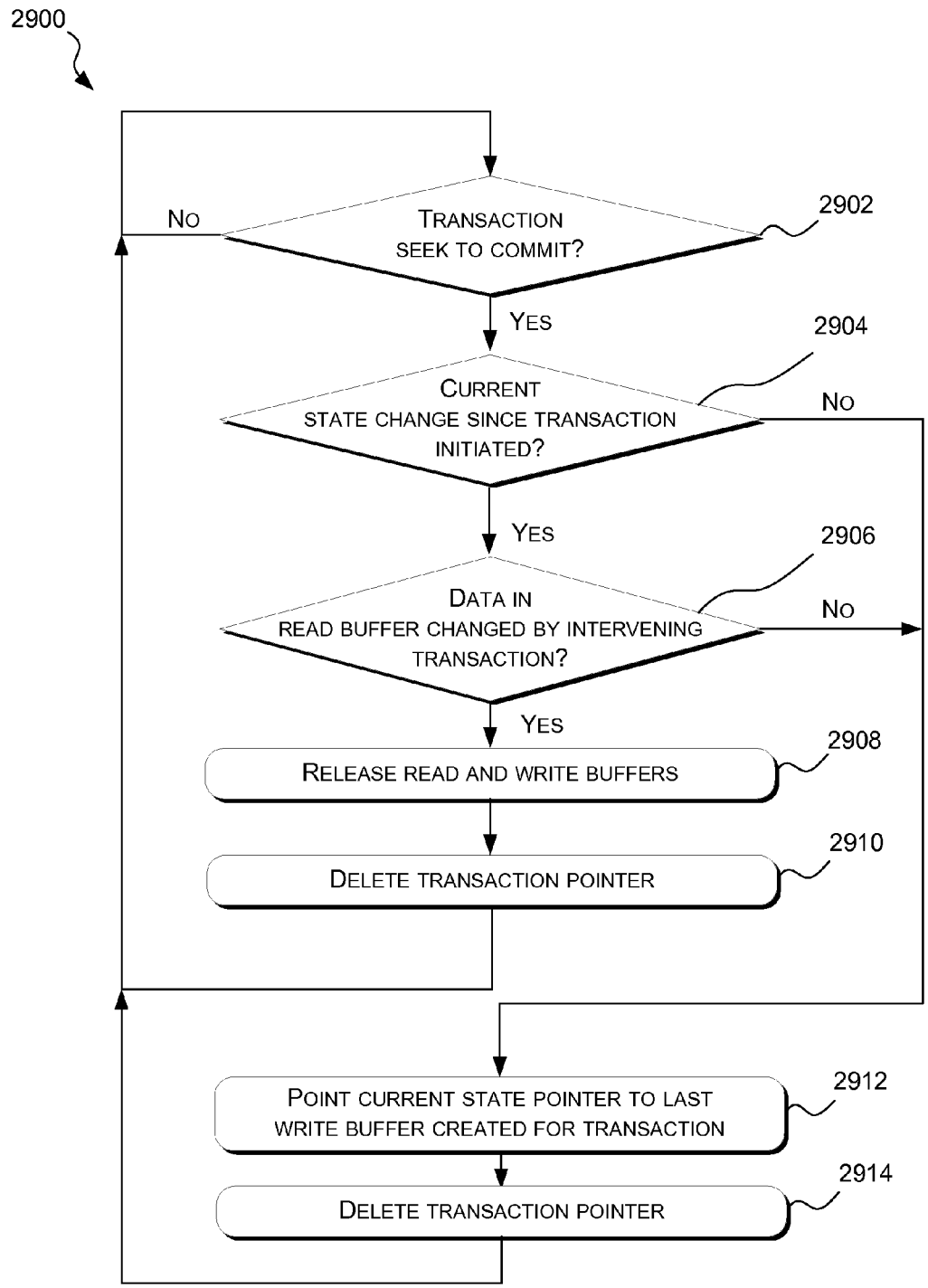
FIG. 29 illustrates a mode of determining when to commit or abort a transaction in the wake of an intervening transaction using read and write buffers.

FIG. 29 illustrates one mode in which the delta pager uses read buffers to determine whether to commit or abort transactions. A flow diagram 2900 begins at block 2902. Block 2902 determines when a completed transaction seeks to commit to the database, and the flow diagram 2900 loops to block 2902 until a transaction seeks to commit to the database. When block 2902 detects a completed transaction that seeks to commit, block 2904 determines whether the current state has changed since the transaction was initiated.

If the current state has not changed, block 2912 points the current state pointer to the single write buffer, or the last of a plurality of write buffers, created for the transaction, which is the buffer to which the transaction pointer also points. Block 2914 deletes the transaction pointer, completing the updating of the database. If the current state of the database has not changed, the delta pager can commit the transaction without examining the read buffer or searching for applied to the database. If the current state has not changed, no intervening transactions will have changed data on which the current transaction relies. The flow diagram 2900 loops to block 2902 to detect a next completed transaction seeking to commit to the database.

On the other hand, if block 2904 determines that the current state has changed since the transaction was initiated, block 2906 determines if the data listed in the read buffer is changed in the current state. Again, this mode of the delta pager only examines the read buffer if the current state has changed as a result of the delta pager committing an intervening transaction. If the data listed in the read buffer has not been changed in the current state, the delta pager will commit the transaction and the flow diagram 2900 advances to block 2912.

On the other hand, if block 2906 finds in the current state that data has been written to the address in the read buffer, or if the value of the data at the address is different than what is stored in the read buffer, the delta pager aborts the transaction. Block 2908 releases the read and write buffers for the transaction. Block 2910 then releases or deletes the transaction pointer for the current transaction, completing the abortion of the transaction. The flow diagram 2900 then loops to block 2902 to await a next transaction seeking to commit.

Coalescing Transactions and Preserving States

The delta pager's write buffers provide many benefits. To name one example, when a transaction cannot be committed and must be aborted, the delta pager ignores or deletes the write buffers it created for the transaction, and the delta pager need not rewrite or undo erroneous or conflicting changes that otherwise may have been applied to the database. However, after the delta pager adds many write buffers to the current state, access to all the data in the current state may become inefficient. Even in the relatively simple example of FIG. 20, a transaction may have to read back through write buffers 1930, 1910, 510, 410, 310, and the original state 110, to determine the value of data the transaction seeks to read. One mode of the delta pager coalesces the write buffers to ensure efficient access to the current state of the database.

Figure 30:
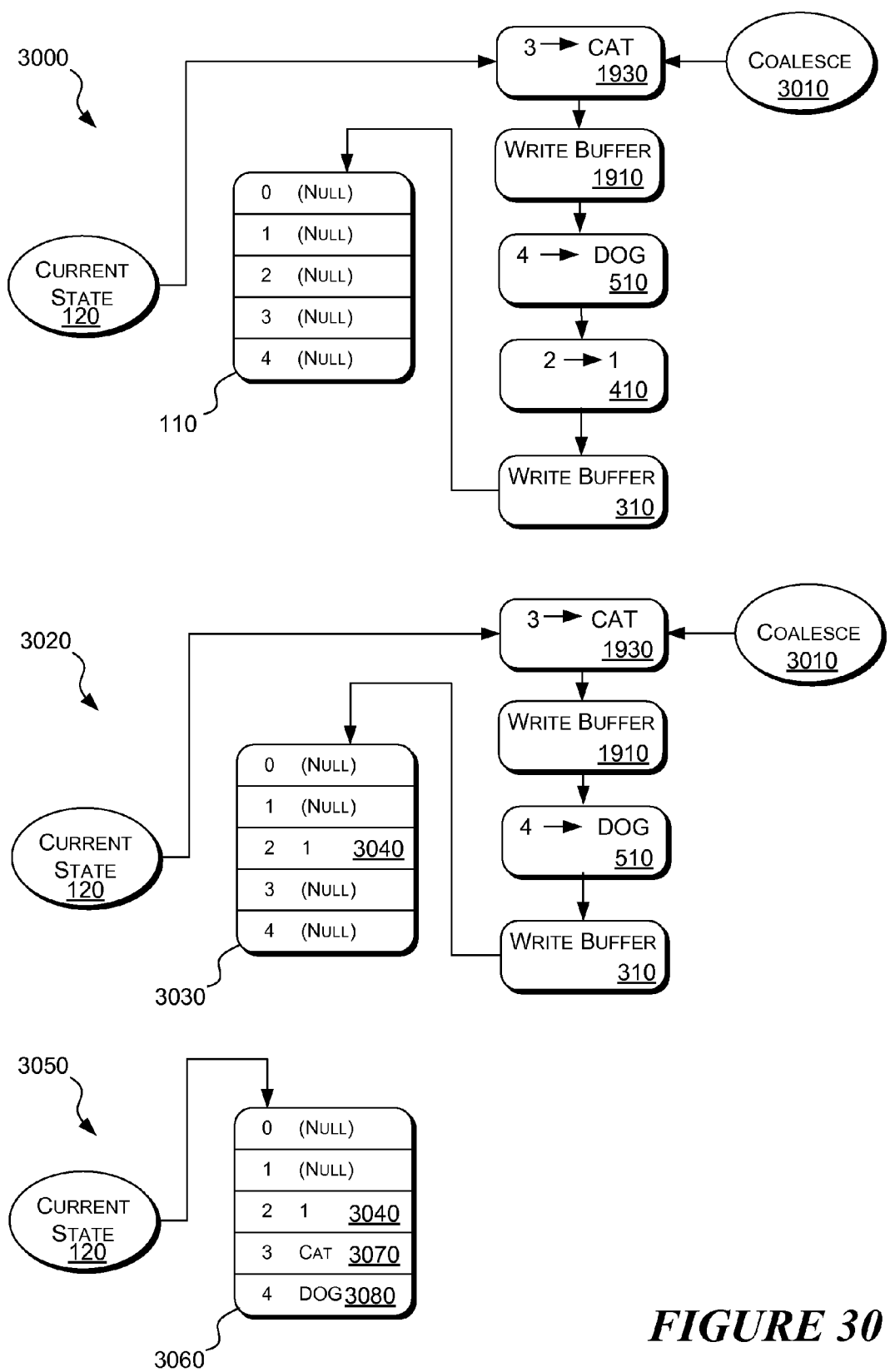
FIGS. 30-31 illustrate the coalescing of buffers.

FIG. 30 illustrates one mode of how the delta pager may coalesce the write buffers of FIG. 20. In FIG. 30, the delta pager coalesces the write buffers by applying changes stored in the write buffers to the original state 110 of the database. In a first phase 3000, the delta pager recognizes a coalesce pointer 3010 that indicates the point to which the write buffers will be coalesced. The benefit of the coalesce pointer 3010 is described further below. The delta pager then applies the change stored in a first write buffer pointing to the original state 110. As FIG. 30 illustrates, the first write buffer was the empty write buffer 310. The delta pager coalesces an empty buffer such as write buffer 310 by omitting the empty write buffer from the current state.

Note that the empty write buffer 310 does not change the partial mapping representing the changes that the transaction seeks to apply to the database. Thus, as soon as the delta pager creates a write buffer that does store a change the transaction seeks to apply, an empty write buffer may be discarded immediately, or the delta pager may not even create an empty write buffer 310. For example, once write buffer 510 is added to change the value at address 4, an embodiment of the delta pager might point write buffer 510 to the state existing at the time the transaction was initiated, and discard the empty write buffer 310.

In a second phase 3020, the delta pager applies the change stored in the next write buffer 410 to the original state 110, replacing the original state with an updated state 3030. The change stored in the write buffer 410, which sets the value at address 2 to 1, is applied to address 2 3040 to create an updated backing store 3030.

A final result 3050 shows a new state 3060 of the database. In the new state 3060, the change stored in write buffer 510 was applied to change the value stored at address 4 3070 to the string "DOG," and the change stored in the write buffer 1930 was applied to change the value stored at address 3 3080 to the string "CAT." The delta pager now switches the current state pointer 120 to point to the new state 3060. The delta pager then omits the coalesce pointer 3010.

There are four points to note about the delta pager's coalescing of buffers. First, even during the coalescing process, each pointer continues to immutably point to a same state of the database. For example, in the second phase 3020, when the delta pager applied the change in write buffer 410 to the original state 110 to create the updated state 3030, the states indicated by the other pointers remained the same. The current state pointer 120, the write buffers 510, 1910, and 1930, and the coalesce pointer 3010 all still pointed to a state of the database presenting all the same values.

Second, if one or more new transactions were initiated and committed to change the current of the database, the new transactions would continue point to an immutable state of the database. Upon initiating a new transaction, the delta pager creates write buffers that point to the current state indicated by the current state pointer 120. If the delta pager commits the transaction, the delta pager switches the current state pointer 120 to point to the last write buffer created for each subsequent transaction. Thus, the delta pager preserves the immutability of states for new transactions even while coalescing write buffers.

Third, the coalesce pointer 3010 indicates a point where the coalescing process will stop. When the delta pager commits additional write buffers to the current state, the delta pager will not coalesce the additional buffers until the delta pager engages in further coalescing. Coalescing may continue indefinitely, but it may not be an efficient use of computing resources to devote computing resources to constantly coalescing what may be few new write buffers.

Figure 31:
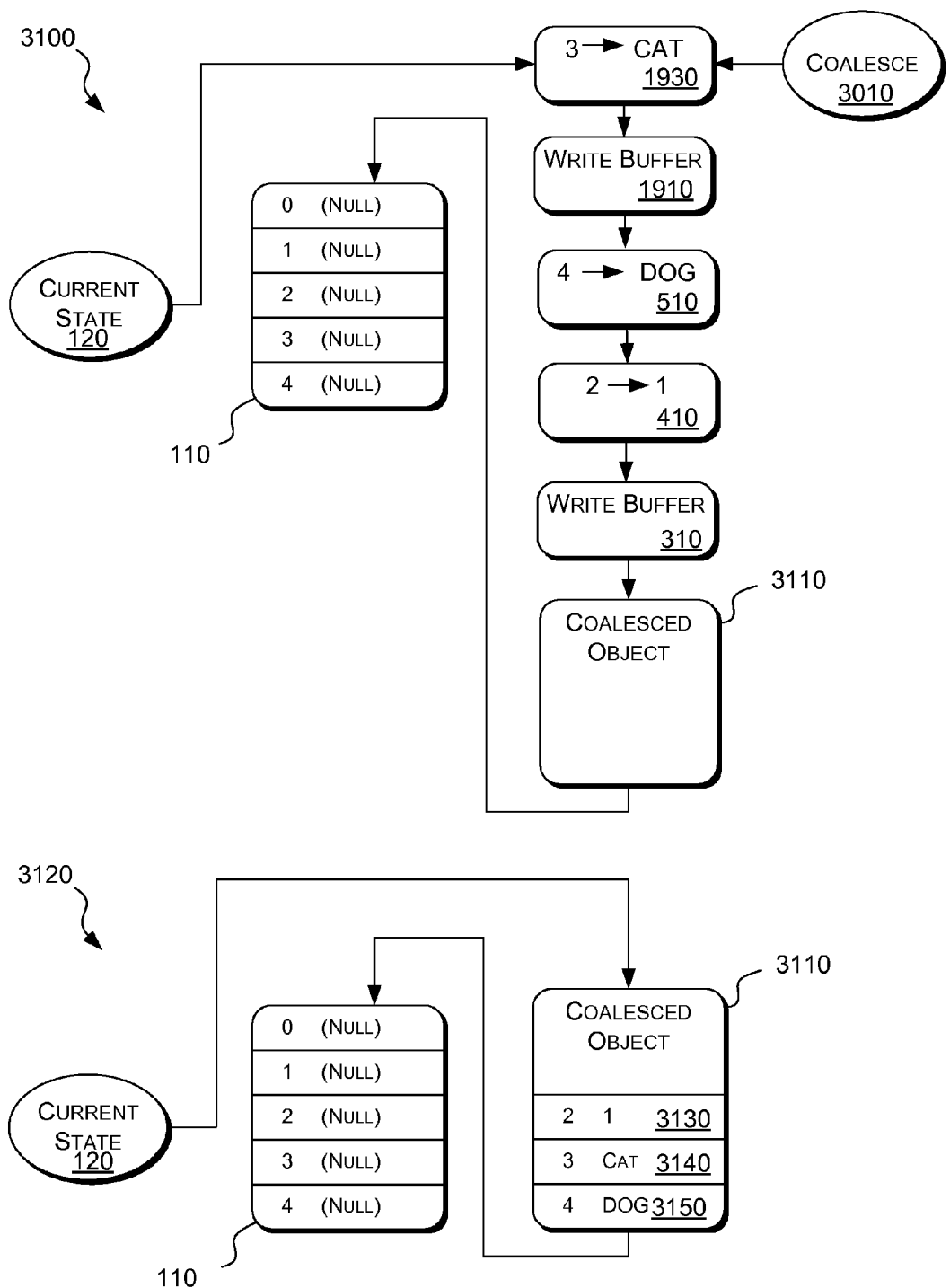

Fourth, as shown in FIG. 31, the delta pager can coalesce buffers without overwriting an original state 110 of the database. For example, the original state 110 may stored in disk storage, which may be inefficient to access, or there may be a desire to maintain the original state 110 without the changes applied by subsequent transactions. Accordingly, the delta pager can coalesce write buffers to one or more intermediate objects.

In FIG. 31, in a first phase 3100 of coalescing write buffers to an intermediate object, the delta pager creates an intermediate, coalesced object 3110 between the first of the write buffers to be coalesced, write buffer 310, and the original state 110. Inserting the coalesced object 3110 does not change the immutability of any of the current states within the database: the current state pointer 120 and write buffers 310, 410, 510, 1910, and 1930 still point to the same state of the database. The coalesced object 3110, as well as the original state 110, may be maintained in any desired storage, including cache memory, memory, disk, or other form of storage.

A final result 3120 shows that the delta pager has coalesced all the changes stored in the write buffers 410, 510, and 1930 to the coalesced object 3110. Thus, the change stored in the write buffer 410, which changes the value at address 2 to 1, instead of being applied to the original state 110, is stored in the coalesced object 3110 at address 2 3130. Similarly, the delta pager stores changes from write buffers 510 and 1930 in the coalesced object 3110 at address 3 3140 and address 4 3150, respectively. The delta pager changes the current state pointer 120 to point to the coalesced object 3110 which, in turn, points to the original state 110. Thus, the state of the database has never changed, and the current state pointer 120 continues to point to the same state of the database existing before the delta pager coalesced the write buffers to the coalesced object 3110.

Advantageously, new transactions seeking to read data now need only check two stores of data: the coalesced object 3110 and the original state 110. If later desired, the delta pager may coalesce the contents of the coalesced object 3110 to the original state to create an updated backing store. Alternatively, the delta pager may maintain the coalesced object and perform subsequent coalescing of write buffers into the same coalesced object 3110. Further alternatively, the delta pager may create additional coalesced objects, as further described below with respect to snapshots.

As previously described, the delta pager maintains the immutability of pointers. In coalesced objects within the database, pointers between buffers that signify intermediate states existing at the time each object was added are eliminated as long the current state is preserved. However, if a pointer other than the pointer from a succeeding buffer points to a buffer, the immutability recognized by the delta pager ensures that the state indicated by the pointer must survive coalescing of the buffers. Taking advantage of the delta pager's immutability of pointers, the delta pager will respect snapshot pointers that point to a selected state and preserve that state even when the delta pager coalesces buffers that precede or follow the snapshot pointer.

Figure 32:
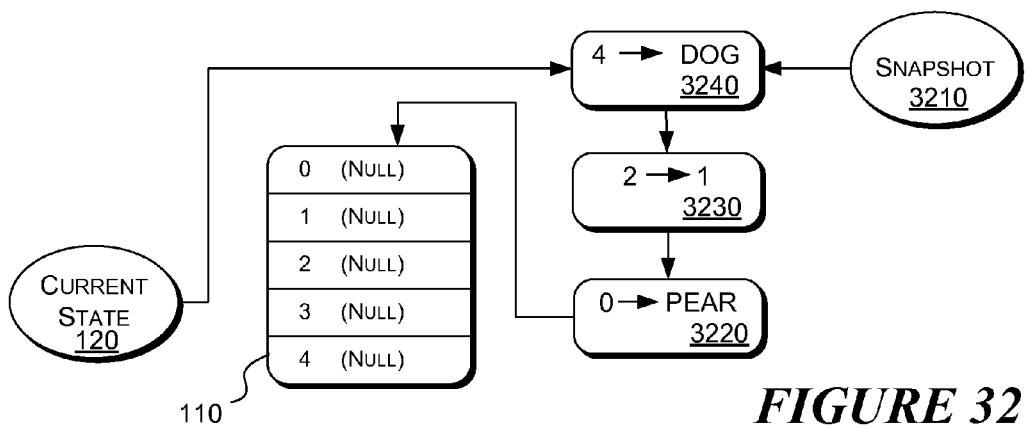
FIGS. 32-34 illustrate using a snapshot object to preserve a selected state of the database from being coalesced into subsequent states.

FIG. 32 illustrates a current state of a database that the delta pager will preserve with a snapshot pointer 3210. The current state pointer 120 points to the current state, in which the original state 110 is modified by write buffers 3220, 3230, and 3240. The first write buffer 3220 writes the string "PEAR" to address 0. The second write buffer 3230 writes the value 1 to address 2. The third write buffer 3240 writes the string "DOG" to the address 4.

When the delta pager is instructed to preserve the current state, the delta pager creates a snapshot pointer 3210 that points to the current state. The delta pager inserts a snapshot pointer 3210 to preserve a state when, for example, a program that automatically preserves regular backups or a user request requests a snapshot of a state such as the current state. Because the snapshot pointer 3210 points to a selected state, the delta pager will maintain the pointer and the corresponding state as a result of the immutability of pointers respected by the delta pager.

Figure 33:
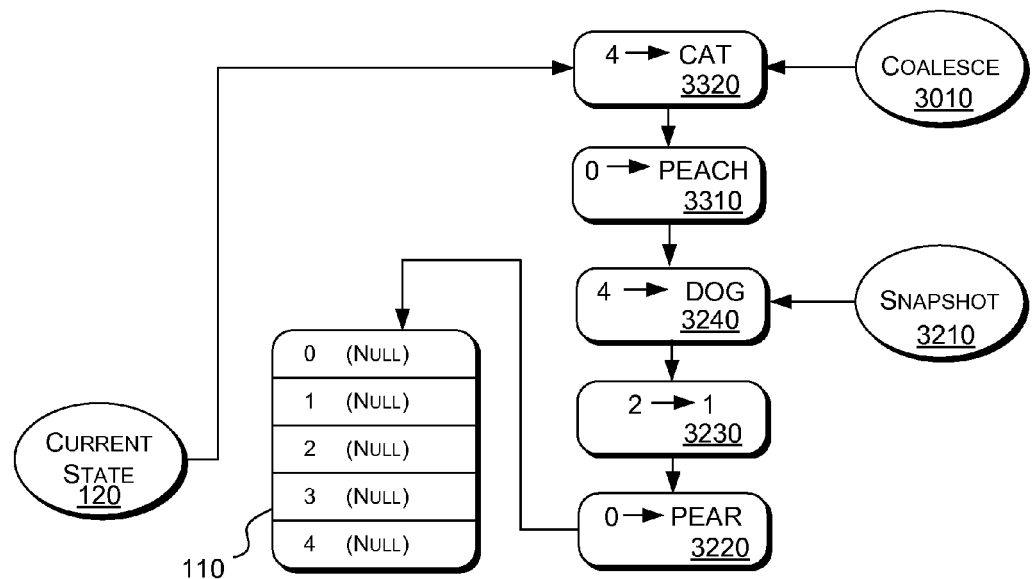

FIG. 33 illustrates a later state of the database after additional transactions have changed the current state. A fourth write buffer 3310 writes the string "PEACH" to address 0. A fifth write buffer 3320 writes the string "CAT" to address 4. The delta pager switches the current state pointer 120 to point to the fifth write buffer 3320. In FIG. 33, the fifth write buffer 3320 overwrites the string "DOG" write buffer 3240 stored at address 4 with the string "CAT." However, the snapshot pointer 3310, still points to write buffer 3240 that represents the state of FIG. 32.

Figure 34:
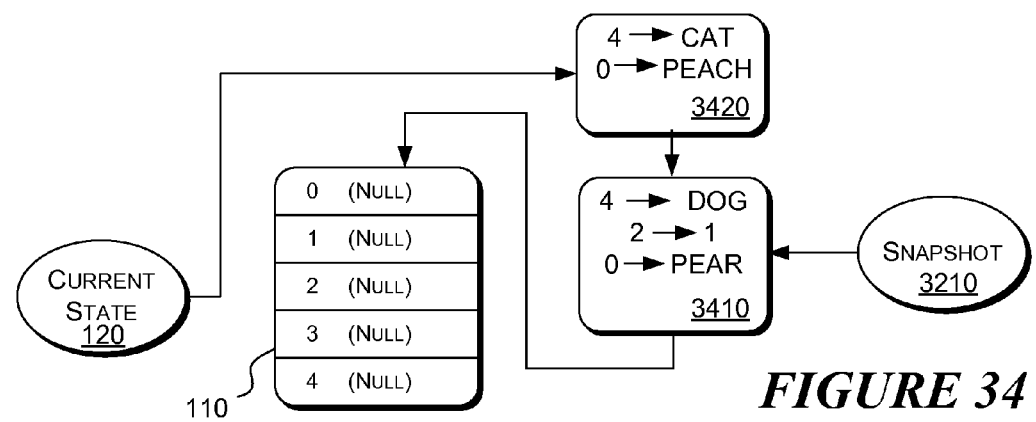

FIG. 34 illustrates coalescing permitted by the delta pager. Assuming a case in which the delta pager will not overwrite the original state 110, the delta pager coalesces objects in the current state of the database by collecting the changes applied by write buffers 3220, 3230, and 3240 between the snapshot pointer 3210 and the backing store of the original state in a first coalesced object 3410. The delta pager then collects the changes applied by write buffers 3310 and 3320 in a second coalesced object 3320. The current state pointer 120 points to the second coalesced object 3420 The second coalesced object 3420 points to the first coalesced object 3410 which, in turn, points to the original state 110.

The delta pager uses separate coalesced objects 3410 and 3420 to preserve the immutability of the pointer of the snapshot object 3210. As long as the snapshot object 3210 exists, the delta pager will maintain the selected state of FIG. 32. Thus, for example, in the current state of FIGS. 33 and 34, the delta pager replaces the string "DOG" stored at address 4 by write buffer 3240 with the string "CAT" stored at address 4 by write buffer 3320. However, in the selected state preserved by the snapshot pointer 3210, the string "DOG" remains stored at address 4 in the first coalesced object 3410.

There are five points to note about snapshot pointers 3210. First, the delta pager may preserve a state of the database at any selected time by adding a snapshot pointer. Second, the delta pager may include multiple snapshot pointers to preserve multiple states. Third, as previously described with regard to coalescing, the delta pager can continue to receive transactions and commit changes to the database while still preserving one or more earlier states because of the immutability of the pointers. Fourth, when a state preserved by a snapshot pointer 3210 is no longer needed, the snapshot pointer 3210 is removed, and subsequent coalescing will release the preserved state.

Fifth, snapshot pointers allow the delta pager to maintain multiple different states in a single data store. When backup images of conventional databases are saved to maintain current states, each image is stored separately because subsequent images overwrite previous images. Multiple states may consume a large volume of storage, and backup images often are relegated to slower storage devices to preserve storage space in faster devices. However, because the delta pager builds subsequent states on earlier states, snapshot pointers preserve the earlier states within a single data store.

Figure 35:
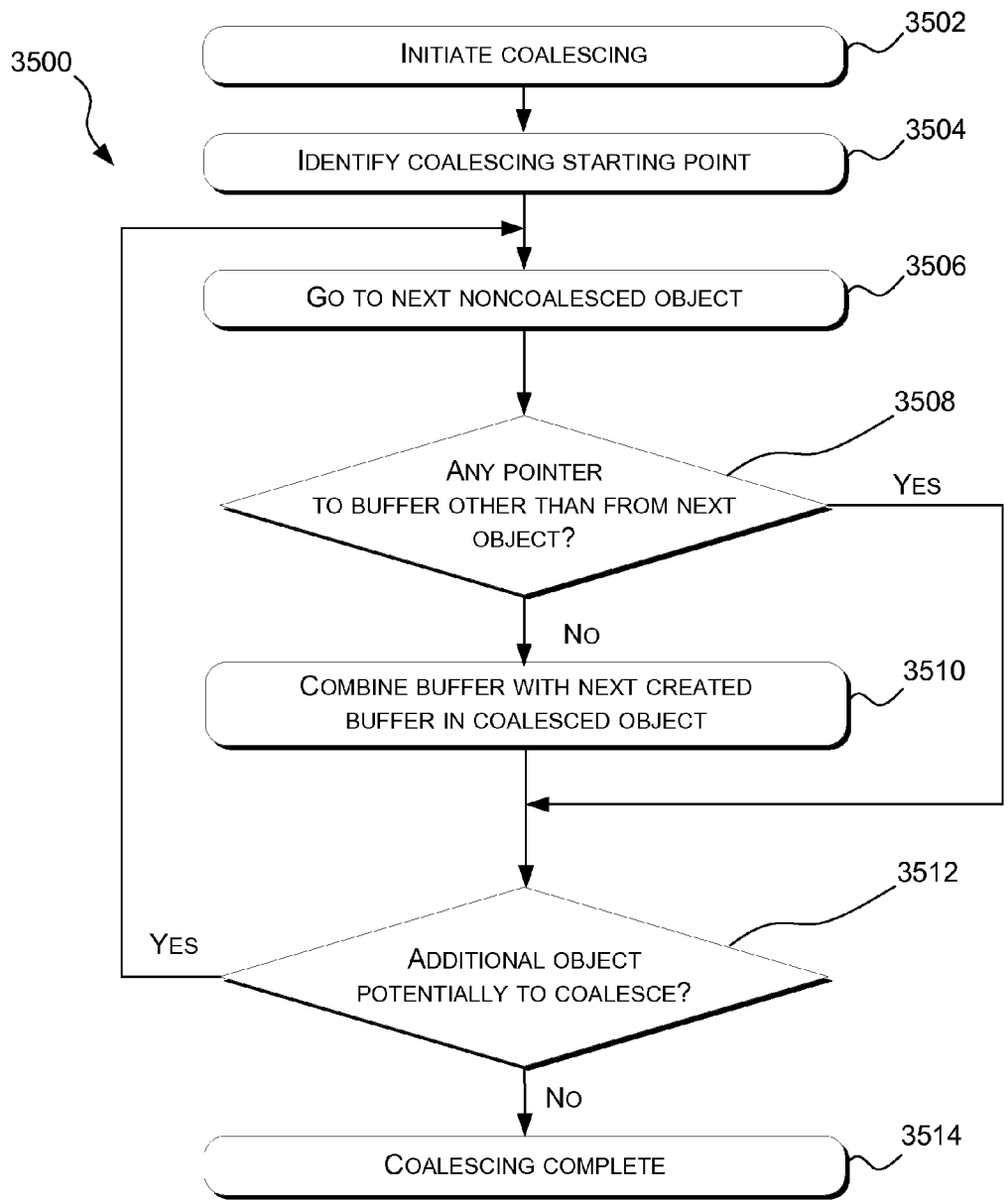
FIG. 35 illustrates a mode of coalescing buffers while preserving one or more selected states.

FIG. 35 illustrates one mode by which the delta pager coalesces buffers or other objects, such as previously created coalesced objects that will now be further coalesced. A flow diagram 3500 begins with block 3502. Block 3502 initiates coalescing of objects in a current state of the database. A program may initiate coalescing at intervals, or a user may initiate coalescing. Block 3504 identifies a coalescing starting point, which may include an original state, as in the example of FIG. 34, a last coalesced object, or another point from which the delta pager will coalesce buffers added to the database. Block 3506 proceeds to the next noncoalesced object. In the example of FIG. 33, starting from the original state 110, block 3504 identifies the starting point for coalescing, as the next noncoalesced object, write buffer 3220.

Block 3508 determines whether there is any pointer to the buffer other than from a next created buffer. A delta pager may eliminate pointers in coalescing a series of buffers or other objects when the state of the database is not changed, but the delta pager will not eliminate other pointers, such as a pointer from a snapshot pointer 3210. If block 3508 determines there is no other pointer than from a next buffer, block 3510 combines the buffer with the next created buffer in a coalesced object. Block 3512 determines whether there is an additional object potentially to coalesce. An additional object may include a next created buffer, or, if objects in the database were previously coalesced, there might be a coalesced object to be further coalesced. If there is an additional object potentially to coalesce, the flow diagram 3500 loops to block 3506 to proceed to the next noncoalesced object. However, block 3512 may determine there is no other object to coalesce. For example, if the delta pager has completely coalesced the database, the delta pager will reach the current state pointer 120, which is not coalesced. When block 3512 determines there is not additional object to coalesce, block 3514 completes the coalescing. Completing coalescing might, for example, send or log a message confirming completion of the operation.

On the other hand, block 3508 may determine there is a pointer from other than the next object in the state. For example, as illustrated in FIGS. 32-34, a snapshot pointer 3210 may point to an object to preserve the state that object represents. When block 3508 determines there is another pointer, the flow diagram 3500 advances to block 3512 to determine if there is an additional object potentially to coalesce.

Making States Durable

The delta pager allows for selected portions of the database to be made durable. The delta pager will commit selected portions of the database to nonvolatile storage to preserve them.

Figure 36:
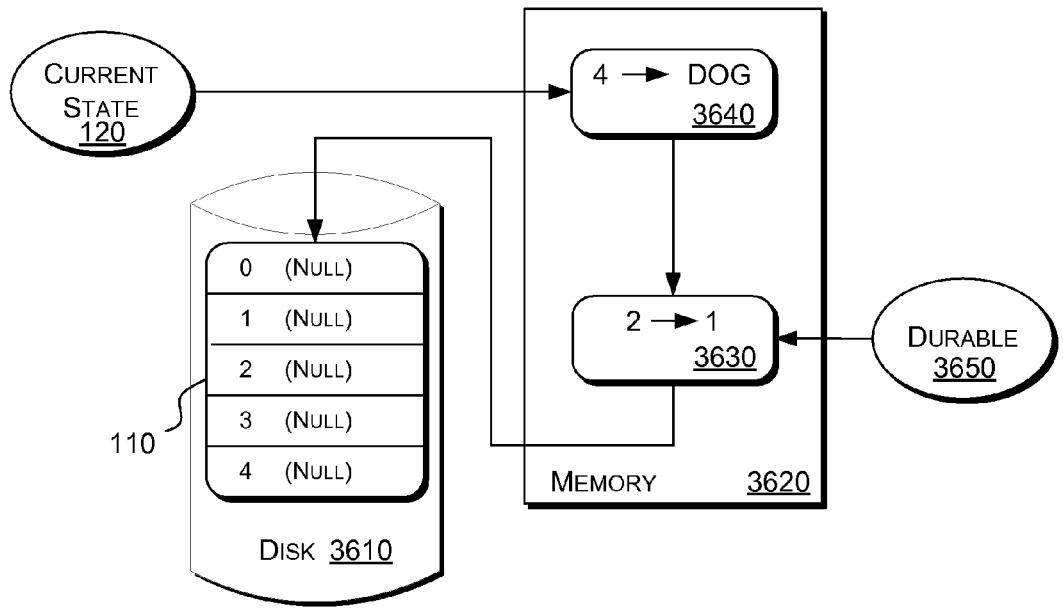
FIGS. 36-37 illustrate a buffer being made durable.

FIG. 36 illustrates a current state of a database including objects stored partially on disk 3610, a durable medium, and partially in memory 3620, a volatile medium. The current state pointer 120 points to the current state, which includes the original state 110 stored on disk 3610 and to which the delta pager has committed changes in write buffers 3630 and 3640.

In one mode, the delta pager allows a program or user to make a selected portion of the database durable by inserting a durable pointer 3650. The durable pointer 3650 points to a state of the database including objects to be made durable. In FIG. 36, the durable pointer 3650 points to a state that includes the first write buffer 3630.

Figure 37:
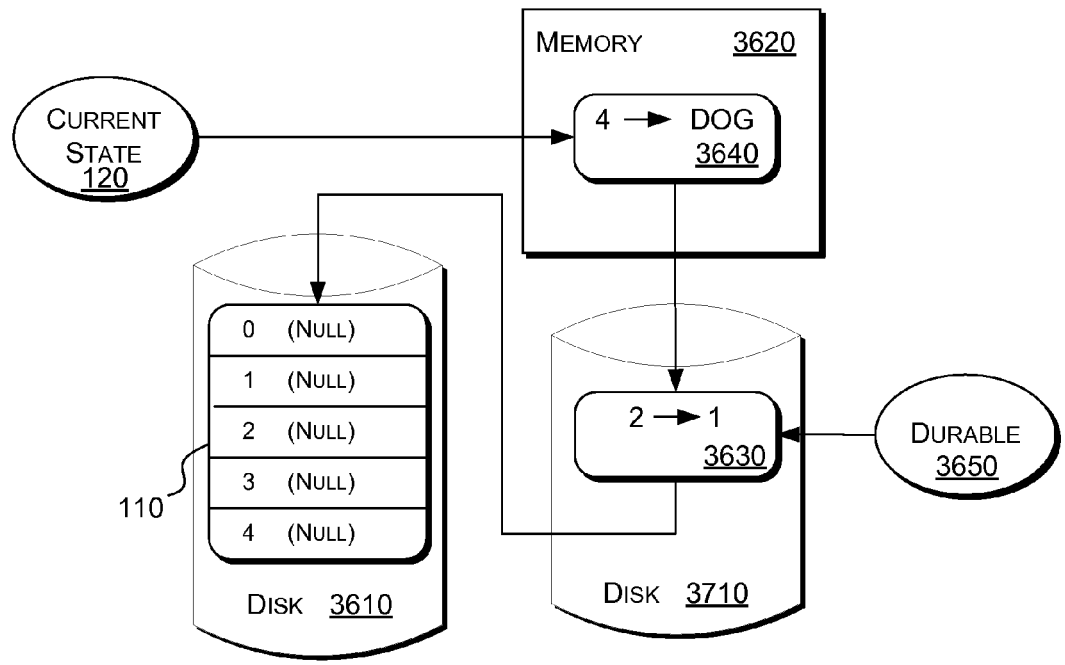

As FIG. 37 illustrates, the delta pager moves any object included in the state indicated by the durable pointer 3250 to durable storable storage, such as disk storage 3710. In the present example, the first write buffer 3630 is moved to disk storage 3710. The delta pager allows a state of the database to reside across any number of storage media. Thus, the disk storage 3710 to which the delta pager writes the first write buffer 3730 may be the same storage device as the disk storage 3610 where the original state 110 resides, or it may be a separate storage device. The second write buffer 3640, which is not included in the state to which the durable pointer 3650 points, is left in memory 3620.

Once the delta pager stores a portion of the current state of the database indicated by the durable pointer 3650 to durable storage, the delta pager may release the durable pointer. The delta pager may generate a message confirming the selected portion of the database has been made durable.

Figure 38:
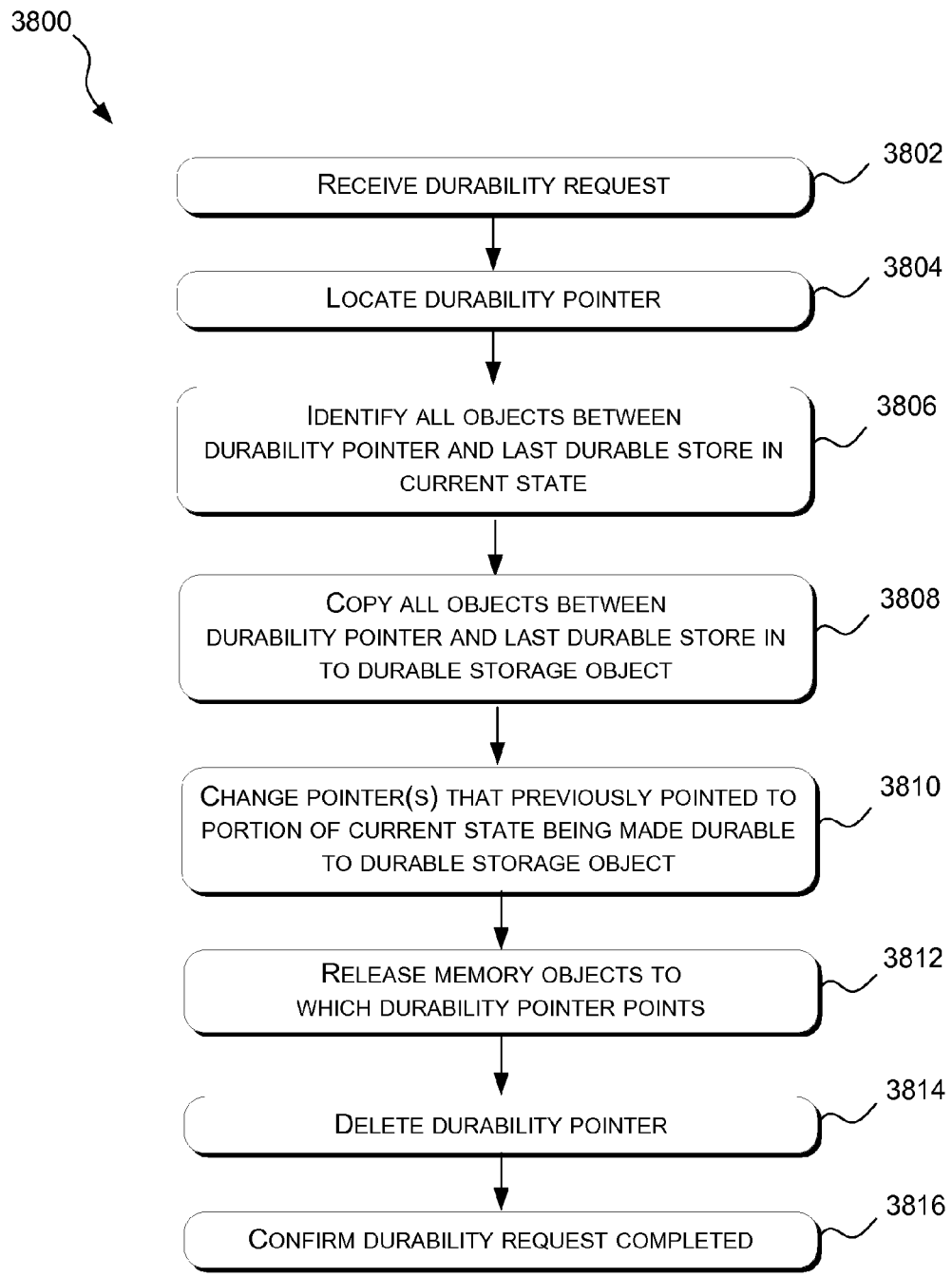
FIG. 38 illustrates a mode of making objects durable.

FIG. 38 illustrates one mode by which the delta pager makes buffers durable. A flow diagram 3500 begins with block 3802. Block 3802 receives a durability request. Block 3804 locates the durability pointer to determine the portion of the database to be made durable. Block 3806 identifies all objects between the durability pointer and the last durable storage portion in the database to be made durable. Block 3808 copies all objects between the durability pointer and the last durable store to a durable storage object. Block 3810 changes any pointers pointing to the portion of the current state to be made durable to the durable storage object. In the example of FIG. 37, the delta pager changes the pointer of the write buffer 3640 to the durable object. Alternatively, for example, if there were other pointers to the state to which the durable pointer 3650 points, such as a current state pointer 120 or a snapshot pointer 3210, these pointers also would be pointed to the durable object created by block 3808.

Once objects in the state to which the durability pointer 3650 points are copied to the durable object and pointers to the state have been changed, block 3812 releases the objects in memory to which the durability pointer points to release the memory for other uses. Block 3814 deletes the durability pointer. Block 316 confirms completion of the durability request by, for example, sending a message to a user making the durability request or adding a message to a system log.

Caching Data

The delta pager also provides for caching data to improve performance. The delta pager allows for duplicative storage of data, such as with a series of cumulative buffers described with reference to FIGS. 7-9. Duplicative stores of data within a state do not change the state. Thus, the delta pager may cache data stored on a low-speed store, such as disk storage or other mass storage, in a high-speed store, such as memory, without altering the state.

Figure 39:
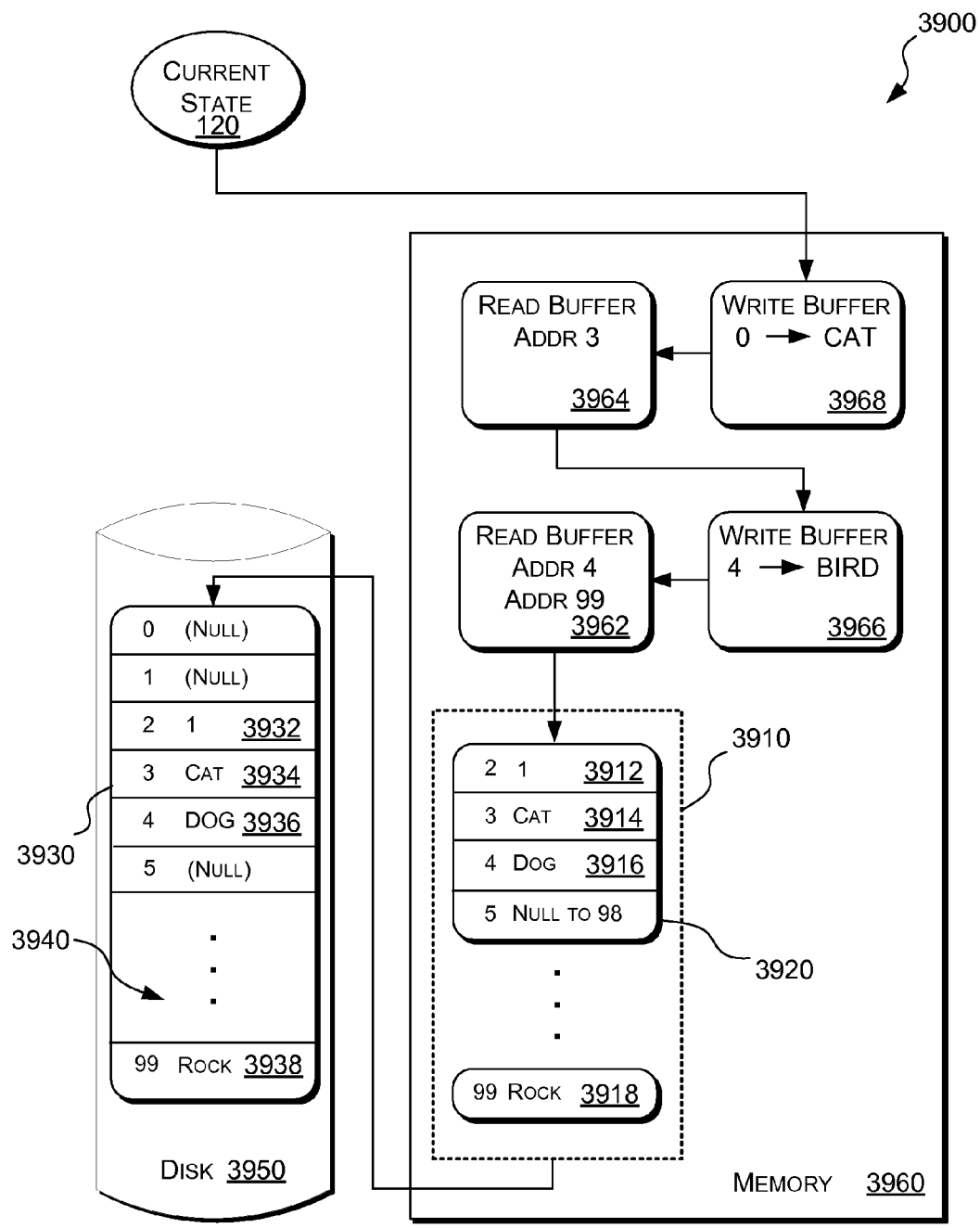
FIG. 39 illustrates the use of a cache object.

FIG. 39 illustrates a current state of a database that includes a cache object 3910. The cache object points 3910 points to an object to be cached, such as a durable object 3930 stored in disk storage 3950. The delta pager points a first object not stored in the durable object 3930, which in this case is read buffer 3962, to the cache object 3910.

In the current state, if a transaction looks for the value of address 0, the transaction will find the current value for address 0 in write buffer 3968, which writes the string "CAT" to the current state. The transaction need look no further than write buffer 3968, and the transaction will receive the value of address 0 at memory retrieval speed. On the other hand, if a transaction seeks the value stored at address 2, the delta pager would seek the value throughout the current state until finding it. Without the cache object 3910, the delta pager would go to the durable object 3930 in disk storage 3950. Accessing data from disk storage 3950 is slow compared to accessing memory 3960. Creating the cache object 3910 in memory 3930 may improve access efficiency.

In the example of FIG. 39, the durable object 3930 stores values at a range of addresses, such as address 2 3932 storing the value 1, address 3 3934 storing the string "CAT," and address 4 3936 storing the string "DOG." The durable object 3930 also stores a range of null values 3940 where no data is stored, up to address 99 3938 storing the string "ROCK."

The delta pager creates the cache object 3910 in memory 3960. The delta pager points the cache object 3910 to the object being cached which, in this case, is the durable object 3930. The delta pager then points the first non-durable object, read buffer 3962, to the cache object 3910.

Once the delta pager creates the cache object and changes pointers to insert the cache object in the current state, the delta pager populates the cache. In one mode, when the delta pager retrieves data from the durable object 3930, the delta pager stores the same data in the cache object 3910. Also, after taking the time to access the durable object, the delta pager may retrieve a block of data from the durable object 3930 and store it in the cache object 3910. For example, before the cache object 3910 is populated, the transaction for which the delta pager created read buffer 3962 seeks data from address 4, which is stored at address 4 3936 in the durable object 3930. While accessing the durable object 3930, the delta pager also may retrieve data for a block that includes data from address 2 3932, address 3 3934, and other addresses through address 99 3938, and store the data at those addresses in the cache object 3910.

After the delta pager stores data retrieved from the durable object 3930 in the cache object 3910, subsequent requests for data copied to the cache object 3910 will be performed at much faster memory speeds. Thus, if the transaction for which read buffer 3962 was created then requests data from address 99, the delta pager can retrieve the data from address 99 3918 in the cache object 3910. Similarly, if the transaction for which read buffer 3964 requests data from address 3, the delta pager can retrieve the data from address 3 3914 in the cache object without waiting for the delta pager to retrieve data from disk storage 3950.

There are three features to note about the delta pager's cache object 3910. First, the insertion of the cache object 3910 does not change how the delta pager creates and uses data states. For example, even though address 4 3916 in the cache object 3910 stores the string "DOG," a write buffer 3966 may change the state of the database by writing the string "BIRD" to address 4 in the write buffer 3966. In subsequent transactions, the current state to which the current state pointer 120 points will find that the string "BIRD" is stored at address 4 regardless of what the cache object 3910 stores at address 4 3916.

Second, if states using the cache object 3910 are made durable, the delta pager need not reinitiate and repopulate the cache object 3910. Instead, as data is copied to durable storage, when data in the state being copied to disk is different than data stored in the cache object 3910, the delta pager may update the data in the cache object 3910. Alternatively, the delta pager may invalidate entries in the cache object 3910 that are no longer current when compared to the state being copied to durable storage. Both techniques modify a cache of the old state to make it into a valid cache of the updated state. By doing so, the delta pager reuses the cache object indefinitely. If the cache could not be preserved across updates, efficiency would be lost in reconstructing the cache whenever updates were made durable.

Third, the delta pager may use the cache object 3910 to facilitate range queries. The cache object may efficiently discover runs of nulls by issuing range queries to the backing store, and may compactly represent such a run in a portion of the cache object or another object maintained by the delta pager. For example, the representation of a run of nulls may be included in a field in the cache object. Maintaining the representation in an object stored in memory will improve speed of access to the representation of a run of nulls to facilitate range queries. For example, if a transaction wanted to find the next pet string after "BIRD," "CAT," or "DOG," when there is a long string of null data 3940 in the durable object 3930 after "DOG," the cache object 3910 may include an entry in the first null address field, such as for address 5 3920, indicating a last of the addresses in the run storing a null value, or the first of the addresses storing a non-null value to support the range queries.

Figure 40:
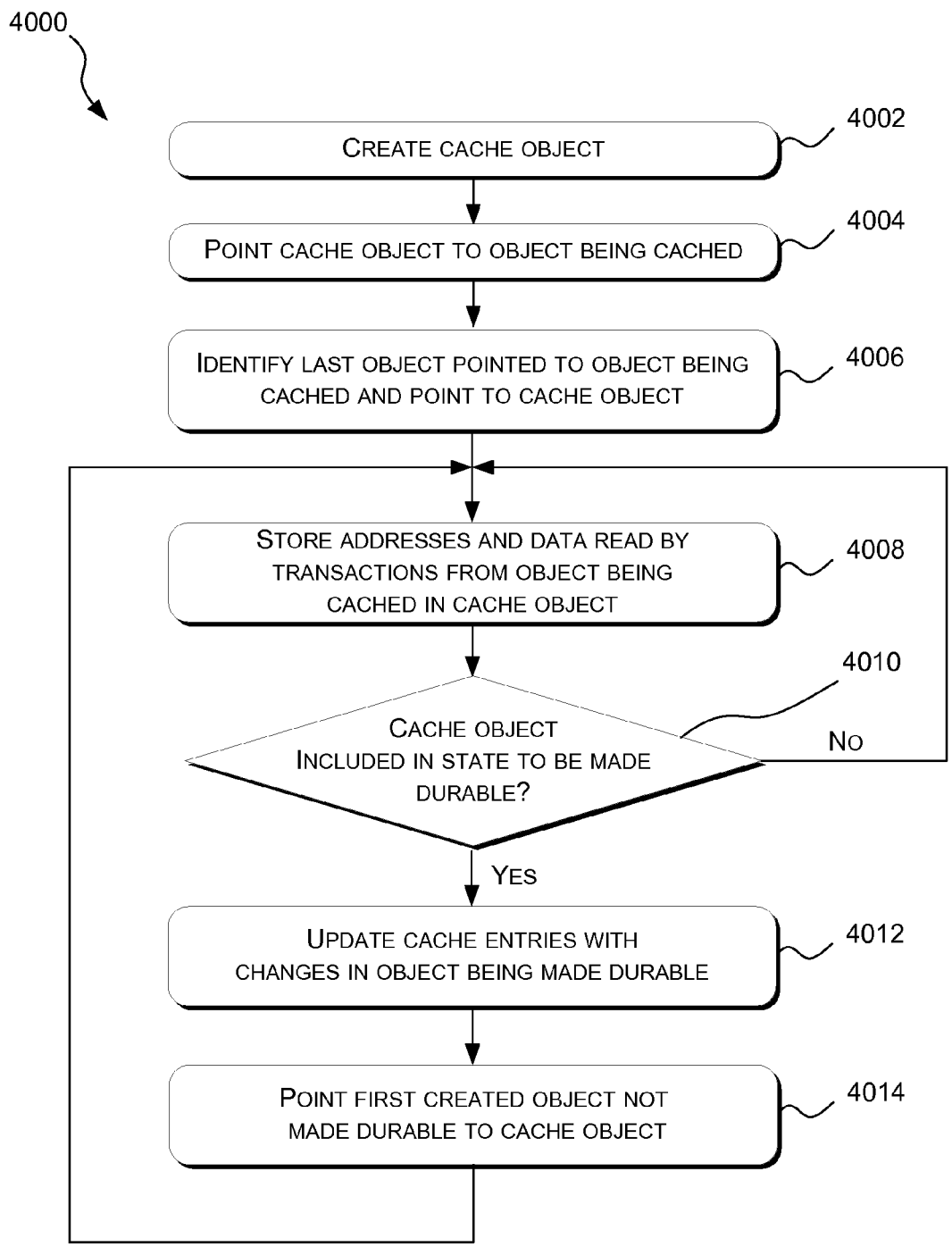
FIG. 40 illustrates a mode of creating and maintaining a cache object.

FIG. 40 illustrates one mode by which the delta pager maintains cache objects. A flow diagram 4000 begins with block 4002. Block 4002 creates the cache object in memory or other fast access storage. Block 4004 points the cache object to the object being cached. Block 4006 identifies the object pointing to the object being cached, and points the object to the cache object. Block 4008 stores addresses and data read by transactions from the object being cached in the cache object. As previously described, when the delta pager retrieves data from the object being cached, preferably the delta pager will retrieve data from a block of addresses adjacent the address read to potentially avert the need for subsequent disk access operations.

Block 4010 determines if a state that points to the cache object is to be made durable. If not, the flow diagram 4000 loops to block 4008 to continue storing addresses and data read by transactions to the cache object. However, when block 4010 determines a state pointing to the cache is to be made durable, block 4012 updates cache entries with changes in the object being made durable. Alternatively, the delta pager may invalidate outdated cache entries instead of updating them. Once block 4012 updates the cache entries, block 4014 points the first object not made durable to the cache object.

Objects Used by the Delta Pager

Figure 41:
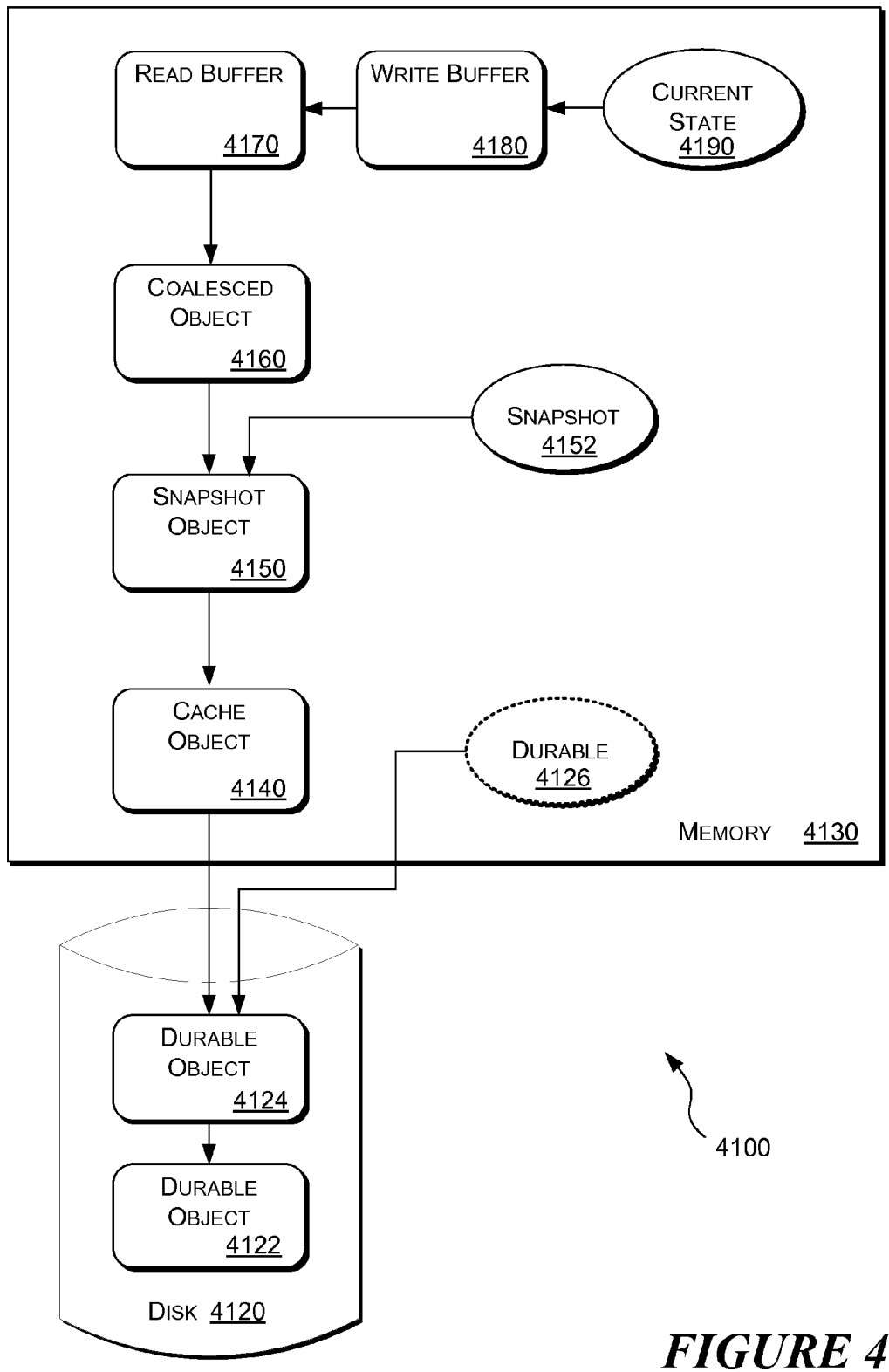
FIG. 41 illustrates a collection of objects previously described.

By way of summary, FIG. 41 illustrates objects the delta pager uses to facilitate the exemplary operations previously described. New reference numbers are used to reference the generic objects represented in this summary. FIG. 41 illustrates an exemplary situation 4100 including a range of such objects stored in durable disk storage 4120 and in memory 4130.

The delta pager may use one or more durable objects 4122 and 4124 in disk storage 4120. These objects may store an original state and any other states that have been made durable as previously described. For example, a durable pointer 4126, presented as dotted outline because it will be removed after the state to which it points, manifested in durable object 4124, has been made durable. Durable objects may be stored on one or more devices.

The delta pager may include a plurality of objects stored in memory 4130. The delta pager 4140 may include a cache object 4140 inserted between durable objects 4122 and 4124 that may be cached, and subsequent objects. A snapshot object 4150, that includes a state preserved by a snapshot pointer 4152, points to the cache object 4140. The snapshot object 4150 includes a selected state including coalesced objects or a series of noncoalesced objects. As previously described, the snapshot pointer 4152 may preserve a state even though objects included in the preserved state or later added to the preserved state are coalesced.

Since a last coalescing operation generated the coalesced object 4160, a plurality of buffers, such as read buffer 4170 and write buffer 4180 are added to the current state. A current state pointer 4190 indicates the current state.

Operating Environment for Implementing Exemplary Embodiments

FIG. 42 illustrates an exemplary operating environment 4200 for implementing a delta pager. The operating environment 4200 is only one example of a suitable operating environment and is not intended to suggest any limitation as to the scope of use or functionality of exemplary embodiments of the delta page as previously described, or other embodiments. Neither should the operating environment 4200 be interpreted as having any dependency or requirement relating to any one or combination of components illustrated in the exemplary operating environment 4200.

Processes of implementing a delta pager may be described in the general context of computer-executable instructions, such as program modules, being executed in operating environment 4200. Generally, program modules include routines, programs, objects, components, data structures, etc., that perform particular tasks or implement particular abstract data types. Moreover, those skilled in the art will appreciate that processes of implementing a delta pager may be practiced with a variety of computer-system configurations, including hand-held devices, multiprocessor systems, microprocessor-based or programmable-consumer electronics, minicomputers, mainframe computers, and the like. Processes of implementing a delta pager may also be practiced in distributed-computing environments where tasks are performed by remote-processing devices that are linked through a communications network. In a distributed-computing environment, program modules may be located in both local and remote computer-storage media including memory-storage devices.

With reference to FIG. 42, an exemplary operating environment 4200 for implementing processes of a delta pager includes a computer 4210 including a processing unit 4220, a system memory 4230, and a system bus 4221 that couples various system components including the system memory 4230 to the processing unit 4220.

The computer 4210 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 4210. The system memory 4230 includes computer-storage media in the form of volatile and/or nonvolatile memory such as ROM 4231 and RAM 4232. A Basic Input/Output System 4233 (BIOS), containing the basic routines that help to transfer information between elements within computer 4210 (such as during start-up) is typically stored in ROM 4231. RAM 4232 typically contains data and/or program modules that are immediately accessible to and/or presently being operated on by processing unit 4220. By way of example, and not limitation, FIG. 42 illustrates operating system 4234, application programs 4235, other program modules 4236, and program data 4237.

The computer 4210 may also include other removable/nonremovable, volatile/nonvolatile computer-storage media. By way of example only, FIG. 42 illustrates a hard disk drive 4241 that reads from or writes to nonremovable, nonvolatile magnetic media, a magnetic disk drive 4251 that reads from or writes to a removable, nonvolatile magnetic disk 4252, and an optical-disc drive 4255 that reads from or writes to a removable, nonvolatile optical disc 4256 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 4241 is typically connected to the system bus 4221 through a nonremovable memory interface such as interface 4240. Magnetic disk drive 4251 and optical dick drive 4255 are typically connected to the system bus 4221 by a removable memory interface, such as interface 4250.

The drives and their associated computer-storage media discussed above and illustrated in FIG. 42 provide storage of computer-readable instructions, data structures, program modules and other data for computer 4210. For example, hard disk drive 4241 is illustrated as storing operating system 4244, application programs 4245, other program modules 4246, and program data 4247. Note that these components can either be the same as or different from operating system 4234, application programs 4235, other program modules 4236, and program data 4237. Typically, the operating system, application programs, and the like that are stored in RAM are portions of the corresponding systems, programs, or data read from hard disk drive 4241, the portions varying in size and scope depending on the functions desired. Operating system 4244, application programs 4245, other program modules 4246, and program data 4247 are given different numbers here to illustrate that, at a minimum, they can be different copies. A user may enter commands and information into the computer 4210 through input devices such as a keyboard 4262; pointing device 4261, commonly referred to as a mouse, trackball or touch pad; a wireless-input-reception component 4263; or a wireless source such as a remote control. Other input devices (not shown) may include a microphone, joystick, game pad, satellite dish, scanner, or the like. These and other input devices are often connected to the processing unit 4220 through a user-input interface 4260 that is coupled to the system bus 4221 but may be connected by other interface and bus structures, such as a parallel port, game port, IEEE 4294 port, or a universal serial bus (USB) 4298, or infrared (IR) bus 4299. As previously mentioned, input/output functions can be facilitated in a distributed manner via a communications network.

A display device 4291 is also connected to the system bus 4221 via an interface, such as a video interface 4290. Display device 4291 can be any device to display the output of computer 4210 not limited to a monitor, an LCD screen, a TFT screen, a flat-panel display, a conventional television, or screen projector. In addition to the display device 4291, computers may also include other peripheral output devices such as speakers 4297 and printer 4296, which may be connected through an output peripheral interface 4295.

The computer 4210 will operate in a networked environment using logical connections to one or more remote computers, such as a remote computer 4280. The remote computer 4280 may be a personal computer, and typically includes many or all of the elements described above relative to the computer 4210, although only a memory storage device 4281 has been illustrated in FIG. 42. The logical connections depicted in FIG. 42 include a local-area network (LAN) 4271 and a wide-area network (WAN) 4273 but may also include other networks, such as connections to a metropolitan-area network (MAN), intranet, or the Internet.

When used in a LAN networking environment, the computer 4210 is connected to the LAN 4271 through a network interface or adapter 4270. When used in a WAN networking environment, the computer 4210 typically includes a modem 4272 or other means for establishing communications over the WAN 4273, such as the Internet. The modem 4272, which may be internal or external, may be connected to the system bus 4221 via the network interface 4270, or other appropriate mechanism. Modem 4272 could be a cable modem, DSL modem, or other broadband device. In a networked environment, program modules depicted relative to the computer 4210, or portions thereof, may be stored in the remote memory storage device. By way of example, and not limitation, FIG. 42 illustrates remote application programs 4285 as residing on memory device 4281. The network connections shown are exemplary, and other means of establishing a communications link between the computers may be used.

Although many other internal components of the computer 4210 are not shown, those of ordinary skill in the art will appreciate that such components and the interconnections are well-known. For example, including various expansion cards such as television-tuner cards and network-interface cards within a computer 4210 is conventional. Accordingly, additional details concerning the internal construction of the computer 4210 need not be disclosed in describing exemplary embodiments of processes of implementing a delta pager.

When the computer 4210 is turned on or reset, the BIOS 4233, which is stored in ROM 4231, instructs the processing unit 4220 to load the operating system, or necessary portion thereof, from the hard disk drive 4241 into the RAM 4232. Once the copied portion of the operating system, designated as operating system 4244, is loaded into RAM 4232, the processing unit 4220 executes the operating system code and causes the visual elements associated with the user interface of the operating system 4234 to be displayed on the display device 4291. Typically, when an application program 4245 is opened by a user, the program code and relevant data are read from the hard disk drive 4241 and the necessary portions are copied into RAM 4232, the copied portion represented herein by reference numeral 4235.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A computer-implemented method for managing a database, comprising:
   maintaining the database as a series of partial mappings, wherein each of the partial mappings includes at least one assignment of an address to a value;
   recognizing a state of a selected partial mapping as a compilation of the partial mapping as appended to a preceding partial mapping previously added to the series;
   establishing a pointer to the selected partial mapping;
   restricting changes to the selected partial mapping such that there is no change to the state of the selected partial mapping to which the pointer is established;
   identifying a first partial mapping in the series to which no pointer is established;
   identifying a second partial mapping appended to the series after the first partial mapping was appended to the series;
   inserting each assignment included in the second partial mapping in the first assignment by one of:
      adding to a first assignment any assignment included in the second partial mapping not previously included in the first partial mapping; and
      overwriting any assignment included in both the first partial mapping and the second partial mapping with the assignment with the assignment included in the second partial mapping; and
   removing the second partial mapping from the series.

2. A method of claim 1, further comprising determining the assignment of the address to the value within the selected mapping, including:
   starting from the state indicated by the pointer and progressing toward an opposite end of the series from the state indicated by the pointer; and
   accessing the selected partial mapping until one of:
      the first assignment of the address to the value is found; and
      an end of the series is reached.

3. A method of claim 1, wherein the selected partial mapping includes the partial mapping most recently appended to the series of partial mappings, and the pointer to the selected partial mapping includes a current state pointer.

4. A method of claim 3, further comprising:
   creating a new partial mapping for at least one assignment a transaction seeks to change in the database; and
   pointing the new partial mapping to the state indicated by the current state pointer when the transaction was initiated.

5. A method of claim 4, further comprising committing the transaction once execution of the transaction is complete by pointing the current state pointer to the new partial mapping when one of:
   the current state pointer continues to point to the state indicated by the current state pointer when the transaction was initiated; and
   no intervening transaction has changed a previous assignment accessed by the transaction between the state indicated by the current pointer when the transaction was initiated and a new state indicated by the current state pointer.

6. A method of claim 5, further comprising, when the transaction is not committed, aborting the transaction by discarding the new partial mapping.

7. A method of claim 1, wherein the pointer is established to the selected partial mapping to preserve a snapshot of the selected partial mapping.

8. A method of claim 1, further comprising caching data from a low-speed store in a high-speed store, including:
    storing the first partial mapping in the high-speed store;
    storing the second partial mapping in the low-speed store; and
    ordering the partial mappings in the series such that a first state of the first partial mapping is defined by reference to the second partial mapping.

9. A method of claim 8, wherein the high-speed store includes memory and the low-speed store includes disk storage.

10. A method of claim 8, further comprising at least one of:
    copying at least one assignment from the second partial mapping to the first partial mapping; and
    copying the at least one assignment from the first partial mapping to the second partial mapping.

11. A method of claim 8, further comprising, upon writing a new assignment to the first partial mapping, writing the new assignment to the second partial mapping.

* * * * *